United States Patent
Zoppas et al.

(10) Patent No.: US 9,796,119 B2
(45) Date of Patent: Oct. 24, 2017

(54) INJECTION MOLD OF A PLASTIC PREFORM

(71) Applicant: S.I.P.A. Societa' Industrializzazione Progettazione E Automazione S.P.A., Vittorio Veneto (IT)

(72) Inventors: Matteo Zoppas, Conegliano (IT); Alberto Armellin, Vittorio Veneto (IT); Sandro Serra, Oderzo (IT); Michele Varaschin, Vittorio Veneto (IT)

(73) Assignee: S.I.P.A. SOCIETA' INDUSTRIALIZZAZIONE PROGETTAZIONE E AUTOMAZIONE S.P.A., Vittorio Veneto (IT)

( * ) Notice: Subject to any disclaimer, the term of this patent is extended or adjusted under 35 U.S.C. 154(b) by 142 days.

(21) Appl. No.: 14/762,082

(22) PCT Filed: Jan. 21, 2014

(86) PCT No.: PCT/IB2014/058439
§ 371 (c)(1),
(2) Date: Jul. 20, 2015

(87) PCT Pub. No.: WO2014/111905
PCT Pub. Date: Jul. 24, 2014

(65) Prior Publication Data
US 2015/0352763 A1 Dec. 10, 2015

(30) Foreign Application Priority Data

Jan. 21, 2013 (IT) .............................. RM2013A0036

(51) Int. Cl.
*B29C 45/17* (2006.01)
*B29B 11/08* (2006.01)
(Continued)

(52) U.S. Cl.
CPC .......... *B29C 45/1761* (2013.01); *B29B 11/08* (2013.01); *B29B 11/12* (2013.01);
(Continued)

(58) Field of Classification Search
CPC ..... B29C 45/1761; B29C 45/02; B29C 45/42; B29C 45/06; B29C 45/561; B29C 45/27;
(Continued)

(56) References Cited

U.S. PATENT DOCUMENTS 6,602,065 B1   8/2003  Ingram
9,469,062 B2 * 10/2016  Zoppas ................... B29B 11/08

FOREIGN PATENT DOCUMENTS

WO   WO 2008/017915 A2   2/2008
WO   WO 2011/161649 A1  12/2011

OTHER PUBLICATIONS

Intl Search Rpt PCT/IB2014/058439, dated May 20, 2014, S.I.P.A Societa' Indust.

* cited by examiner

*Primary Examiner* — John C Hong
(74) *Attorney, Agent, or Firm* — Davis, Malm & D'Agostine, P.C.

(57) ABSTRACT

An injection mold of a plastic preform includes first, second and third parts, the third part having a molding cavity defining an axis and adapted to be fixed to a first surface of a mold frame; the second part between the first and third parts slides along the axis to close or open the cavity. The first part includes a rod that slides along the axis through a second surface of the frame. The second part includes:
a guiding cage through which the longitudinal rod can slide; a structure; and parallel guiding rods extending to the structure;
an assembly sliding inside the cage; and a punch sliding inside the structure and defining a first complementary component of the cavity;

(Continued)

wherein the structure defines, together with the punch, a cam system for opening or closing two half-collars which define, when closed, a second complementary component of the cavity.

14 Claims, 21 Drawing Sheets

(51) Int. Cl.
*B29B 11/12* (2006.01)
*B29C 45/56* (2006.01)
*B29C 45/42* (2006.01)
*B29C 45/02* (2006.01)
*B29C 45/06* (2006.01)
*B29L 31/00* (2006.01)
*B29C 45/27* (2006.01)
*B29C 45/54* (2006.01)

(52) U.S. Cl.
CPC .............. *B29C 45/02* (2013.01); *B29C 45/06* (2013.01); *B29C 45/42* (2013.01); *B29C 45/561* (2013.01); *B29C 45/27* (2013.01); *B29C 45/54* (2013.01); *B29L 2031/757* (2013.01)

(58) Field of Classification Search
CPC ......... B29C 45/54; B29B 11/12; B29B 11/08; B29L 2031/757
See application file for complete search history.

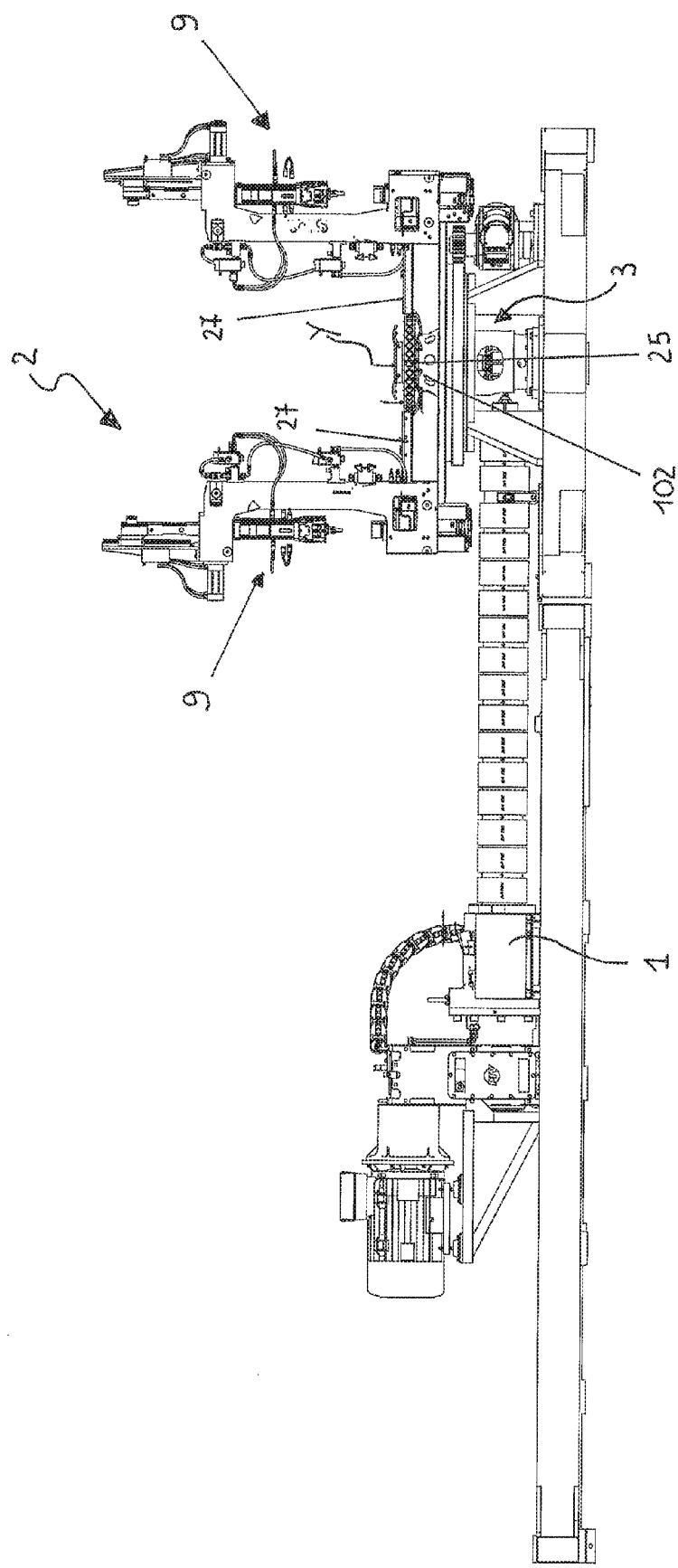

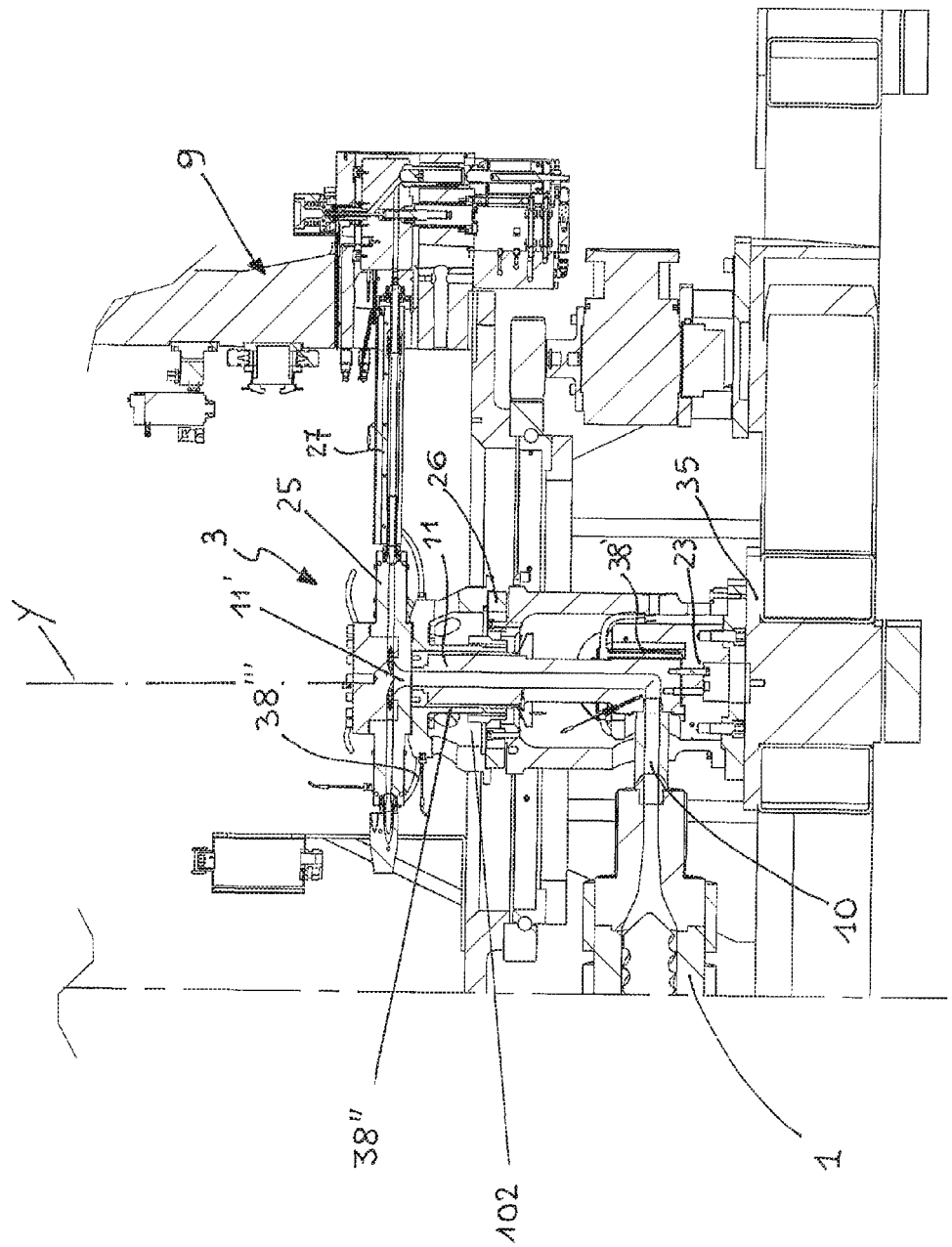

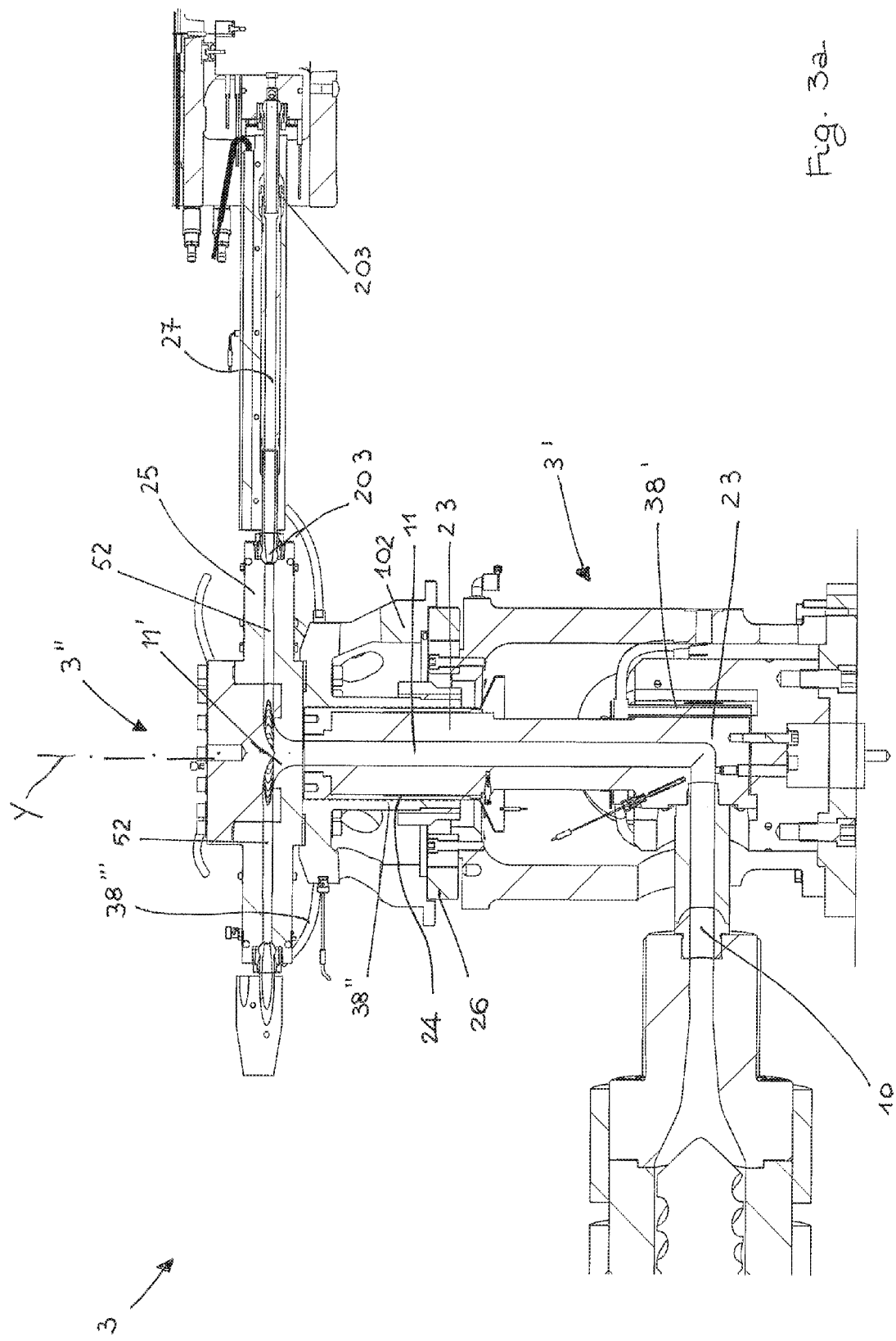

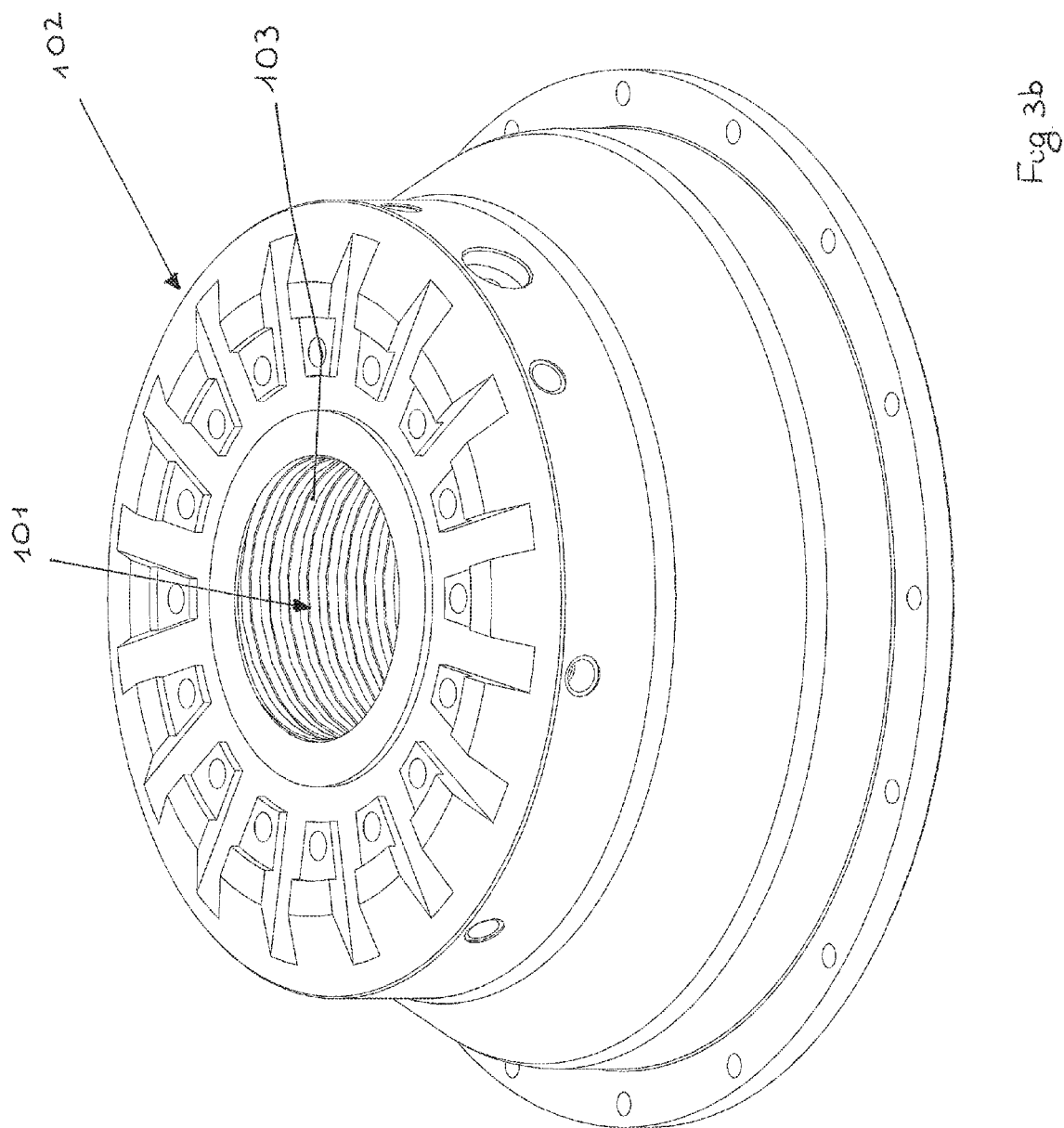

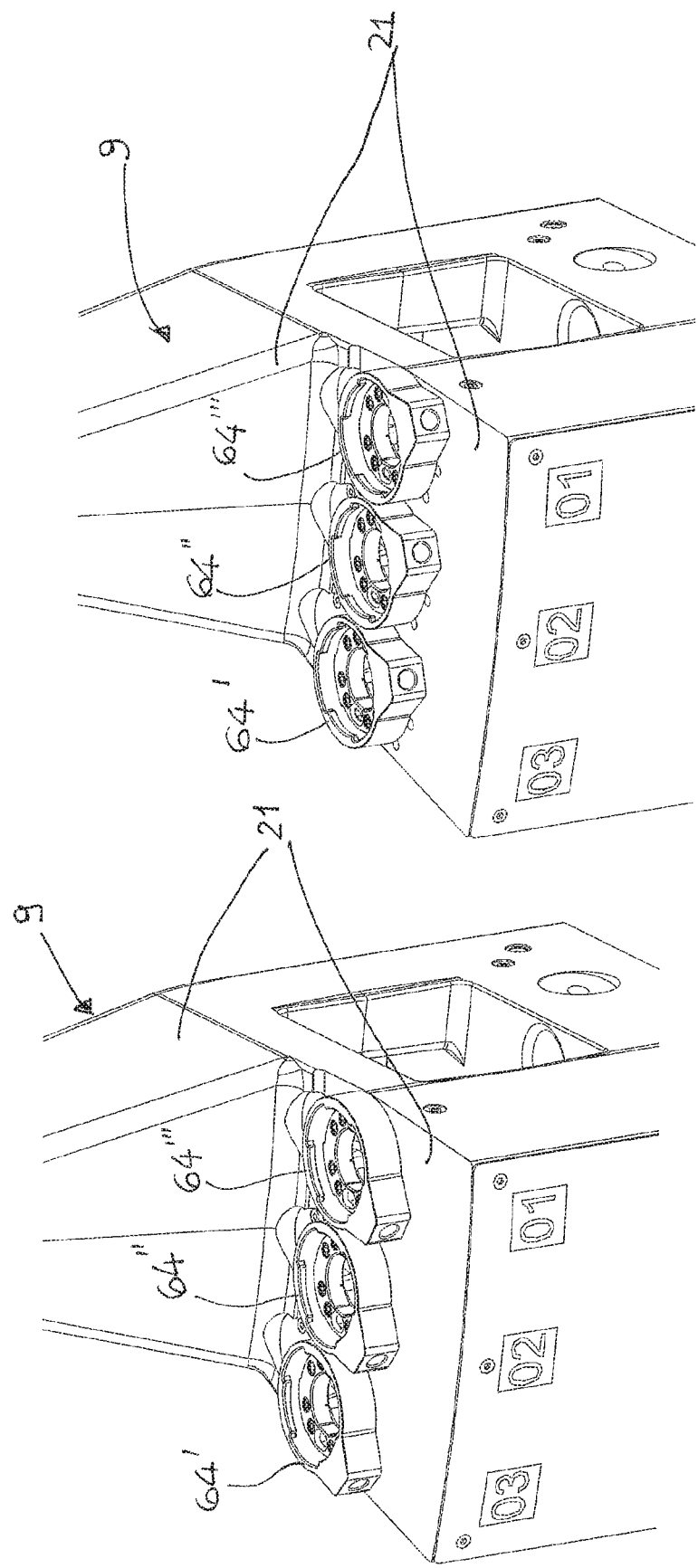

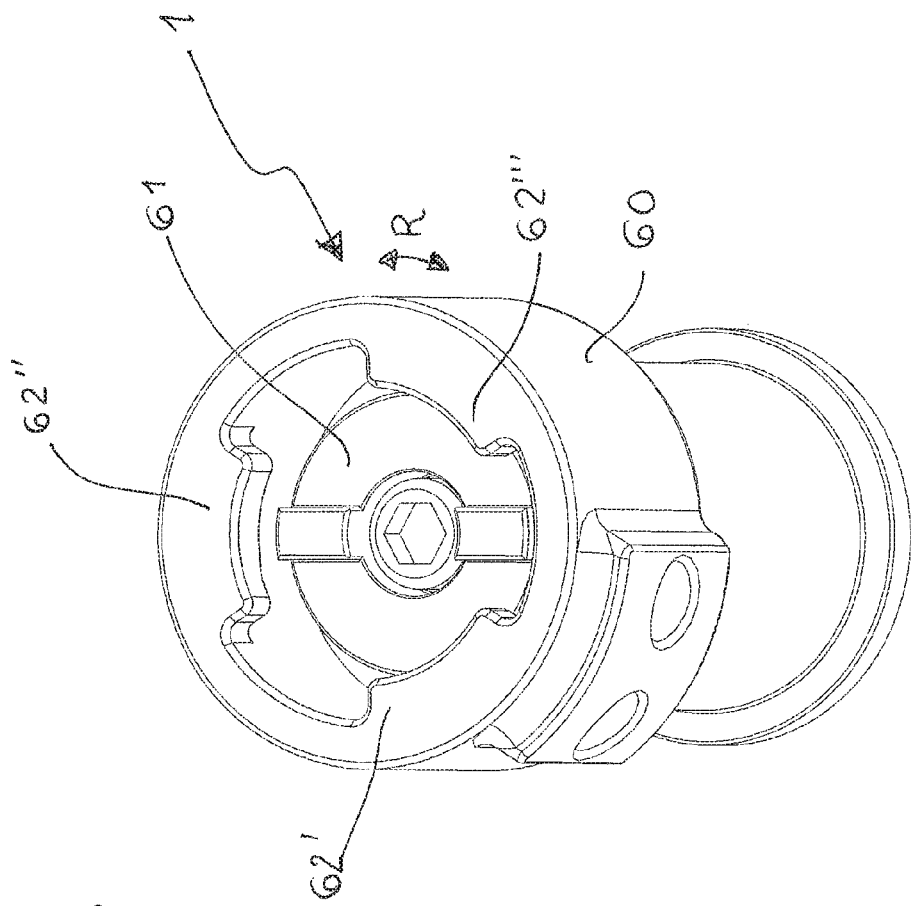
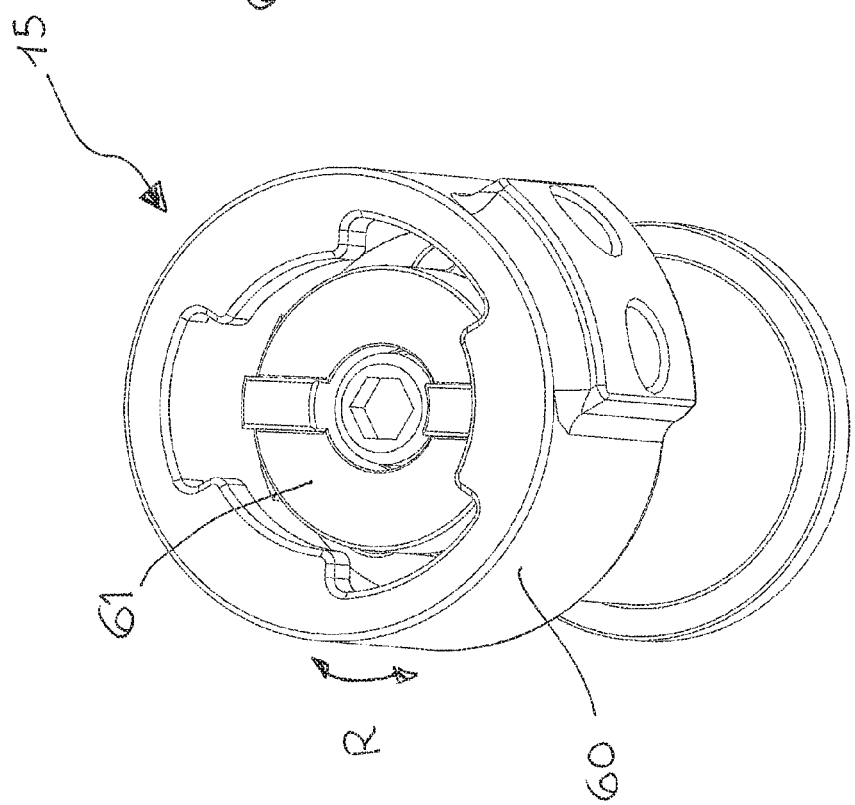

INJECTION MOLD OF A PLASTIC PREFORM

FIELD OF THE INVENTION

The present invention relates to an injection mold for a rotary machine for molding preforms made of thermoplastic material, e.g. PET, by injection-compression, intended to manufacture food-grade containers, especially bottles.

STATE OF THE ART

The production of very high numbers of thermoplastic containers, in particular of bottles, is a process which, starting from the raw material, generally polyethylene terephthalate or PET, allows to obtain finished containers of even particularly complex shape which are suited to the most varied market needs, and which are particularly light and strong even when subjected to heavy pressure at ambient temperature. The transition of PET in raw state in the form of granules to plastic container can be carried out either by means of a one-stage process or by means of a two-stage process, as desired.

The one-stage process is carried out using a single plant in which the transition of PET from granules to preform, by means of a step of injecting into molds, and the transition from preform to plastic container, by means of a step of stretching-blowing, occur continuously without the preform being allowed to cool down completely up to ambient temperature. The preform thus still preserves part of the latent heat remaining from the step of injecting, with a considerable saving of energy, because the preforms require less heat to be returned to the suitable blowing temperature with respect to the case in which they must be heated starting from ambient temperature.

A so-called two-stage process instead is carried out in two plants which are generally but not necessarily separate: one plant carries out the first part of the container manufacturing process with the transition of PET in granules to preform, i.e. carries out the step of injecting the PET preforms in injection molds. The second part of the process, which transforms the preform into the final container in a blower using the stretching-blowing technique, which is generally used today for blowing PET containers, is carried out in the second plant. The two-stage process may also be carried out in the same plant, which includes injecting the preforms and blowing them into bottles, but the two operations are carried out in two distinct times. The preforms are allowed to cool down after injection to reach ambient temperature. Next, when the preforms must be transformed into finished containers, in particular bottles, they must be heated in appropriate ovens to take them back to the temperature required for the blowing process typical of the thermoplastic used or necessary for stretching-blowing, if PET is used.

One reason for preferring an integrated one-stage plant is that a plant of this kind ensures a better finished product quality with less consumption of energy, as previously mentioned. The better quality of the finished product is allowed by the possibility of modifying the production parameters in real time, adapting them to the manufacturing needs of the containers in a quick and effective manner. Furthermore, in an integrated one-stage plant, a preform manufacturing error can be immediately detected thus allowing to correct faults of the preform and/or the finished container.

In two-stage plants, instead, a fault occurring on preforms during the injection operation may be detected with a delay such to compromise several days of production. Moreover, the lack of continuity between the two stages prevents all the information of the preform lifecycle from being stored, whereby the step of stretching-blowing occurs without knowing the exact features of the processed preforms at any time. Not less important is the problem that results from the preform contamination when these are not immediately transformed into final containers, if these are intended to contain a food-grade product, thus compromising the shelf-life thereof.

Blowing molding is preferred today also because it is particularly suited for making hollow bodies with a complex shape and many undercuts. Blowing has the great advantage of allowing the production of containers with a body which is much wider than the mouth, such as bottles and flasks. Furthermore, it is preferred over rotational molding because the production cycle, i.e. the cycle time, is shorter. Blowing is a particularly fast, efficient production process adapted to mass container production, such as thermoplastic resin bottles, and in particular PET for beverages, for which the market demands particularly high manufacturing numbers. Short cycle times allows to distribute the plant cost on a very high number of pieces, thus allowing to achieve production rates even in the order of several tens of thousand containers per hour in the larger blowing plants. A key element from the economic point of view is thus the cost of the raw material, e.g. PET, PE, PPE, PP, and thus the reduction of the amount of material used to manufacture a single container is crucial.

One of the problems still to overcome in the making of one-stage plants is their low production rate compared to two-stage plants, because the first part of the container manufacturing process, which is the preform injection process in multiple cavity molds, today the most common, is slower than the second part of the manufacturing process, which is the stretching-blowing process, whereby the latter operation, in which very high production capacities may be already achieved, must run with production capacities which are lower than the maximum capacity to maintain it at the same level as that of the preform injection mold.

A variant of the described technique, which appears most promising from the point of view of production capacity and produced preform quality, is the use of the injection-compression technology which requires less power to work and lower press tonnage for compressing the preform mold. Another advantage of this process is that it subjects the thermoplastic material to a lower stress, allowing to manufacture final containers with very thin walls, while ensuring a high container quality. If a rotational platform is used to implement the injection-compression production cycle instead of an alternating cycle typical of the injection presses, it is easier to integrate the preform molding machine with a rotational blower for blowing the containers if an integrated one-stage plant is used.

In order to increase the production capacity of a molding machine it is also necessary to reduce the downtime for the operations of replacing and maintaining some elements, such as for example the elements of the mold for manufacturing containers which need to be replaced when bottles of different format and size are to be manufactured. WO2011161649 describes a PET bottle manufacturing plant which comprises an injection-compression stage for making preforms followed by a stretching-blowing plant for the preforms for making finished bottles. Although WO2011161649 allows to increase the production speed of a preform by using electromechanical or pneumatic actuators which make it possible to reduce production times, it is does not solve any problem deriving from the need to regularly replace some parts when it is necessary for changing the format of the bottle to be manufactured or for carrying out routine or supplementary maintenance, thus slowing down the manufacturing process because these operations are laborious. It is thus felt the need to provide new rotational injection machines for thermoplastic preforms, in particular made of PET, to comply with the market demand to increase productivity and reduce the cost of preforms without reducing their quality. Solutions have thus been sought to increase the speed of a preform injection-compression machine without decreasing the quality of the manufactured preforms. Furthermore, the need to increase automation and reduce maintenance times in the injection-compression machines of thermoplastic containers is also felt. The need is further felt to increase the automation of an injection-compression machine for thermoplastic containers, and to reduce the downtime for changing the format and for routine and supplementary maintenance, without increasing design complexity nor construction costs.

SUMMARY OF THE INVENTION

It is the object of the present invention to provide an injection mold suitable for a rotary machine for molding thermoplastic preforms, in particular PET preforms, which contributes to increasing the global productivity of the preform manufacturing plant.

It is a further object of the present invention to provide a high-productivity injection-compression apparatus comprising a rotating carousel provided with molding modules with at least two injection molds.

The present invention aims to achieve the aforesaid objects by means of an injection mold of a plastic preform which, according to claim 1, comprises a first part and a second part, fixed to each other, and a third part; wherein the third part is provided with a molding cavity defining an axis Y' and adapted to be integrally fixed to a first surface of a supporting element of the mold by means of first quick-coupling means; wherein the second part is arranged between the third part and the first part and is adapted to slide along said axis Y' in order to close or open the molding cavity;

wherein the first part comprises a longitudinal rod adapted to slide along said axis Y' through a second surface of the supporting element, opposite to and spaced apart from the first surface; wherein the second part is provided with a sliding guiding cage comprising a first plate, provided with a through hole through which the longitudinal rod can slide and configured to abut on said second surface of the supporting element; a base structure; parallel guiding rods fixed at a first end thereof to said first plate and fixed at a second end thereof to said base structure;

an assembly sliding inside said sliding guiding cage, fixed at a first end thereof to said longitudinal rod by means of second quick-coupling means, and comprising at a second end thereof a punch sliding inside the base structure and defining a first complementary component of the molding cavity delimiting the inner shape of the preform;

wherein the base structure is provided with two half-collars and is configured so as to define, together with the punch, a cam system for opening or closing the two half-collars which define, when they are closed, a second complementary component of the molding cavity defining the outer shape of a neck zone of the preform.

A second aspect of the present invention relates to an injection-compression apparatus for manufacturing plastic preforms, which according to claim 15 has a vertical rotation axis Y and comprises:
a fixed supporting base,
a rotating carousel rotating about the rotation axis Y with respect to the fixed supporting base,
a plurality of molds arranged along a periphery of the rotating carousel, said plurality of molds being gathered together into molding modules of at least two molds each,
wherein each mold is a mold according to claim 1.

A further aspect of the invention relates to a method of assembling an injection mold of a plastic preform which, according to claim 16, comprises the following steps:
a) integrally fixing the first part to the second part of the mold by hooking the longitudinal rod to the assembly, sliding within the sliding guide cage, by means of the second quick-coupling means,
b) integrally fixing the third part of the mold to said first surface of a supporting element by hooking a clutch, arranged at the base of the molding cavity, to said first surface by means of the first quick-coupling means.

By virtue of the features of the injection mold of the invention, a rotating carousel can be made containing the preform injection molds in groups of two, three or four, offering the following advantages:
a reduced mechanical cycle time for opening and closing the injection-compression mold;
reduction of downtime for format change;
a better centering of the mold punch in the molding cavity with the result of improving the molded preform concentricity;
release from deformations caused by thermal expansions and from typical mechanical constraints of multiple cavity structures;
higher container production rates because the carousel can be rotated at higher rotation speeds, with respect to plants having molds arranged in a different manner, by virtue of the innovative rotary joint for the melted resin distribution;
possibility of using robotized systems for disassembling and refitting the machine or subgroups thereof by virtue of the apparatus architecture modularity;
the possibility of obtaining high quality preforms and reducing the manufacturing waste by virtue of the resin dosing accuracy provided by the apparatus when dispensing the resin into each mold.

The resulting global advantage is higher hourly productivity rate of better quality preforms.

The dependent claims describe preferred embodiments of the invention forming an integral part of the present description.

BRIEF DESCRIPTION OF THE DRAWINGS

Further features and advantages of the present invention will become apparent in the light of the detailed description of preferred, but not exclusive, embodiments of an injection-compression apparatus, illustrated by way of non-limitative example, with the aid of the accompanying drawings, in which:

FIG. 2a is a partial side view of the plant in FIG. 1;

FIG. 3 is a section view along an axial plane of a component of the plant in FIG. 1;

FIG. 3a is an enlarged section view of the component in FIG. 3;

FIG. 3b is an axonometric view of an enlarged detail of the component in FIG. 3a;

FIGS. 8 and 9 are axonometric views of part of the molding module in FIG. 4 in two different operating positions;

FIGS. 10 and 11 are axonometric views of an enlarged element of the parts of the mold in FIG. 6 in two different operating positions;

The same reference numbers and letters in the figures refer to the same members or components.

DETAILED DESCRIPTION OF A PREFERRED EMBODIMENT OF THE INVENTION

A preferred embodiment of an injection-compression apparatus for thermoplastic resin containers is described below with particular reference to the aforesaid figures.

Figure 1:
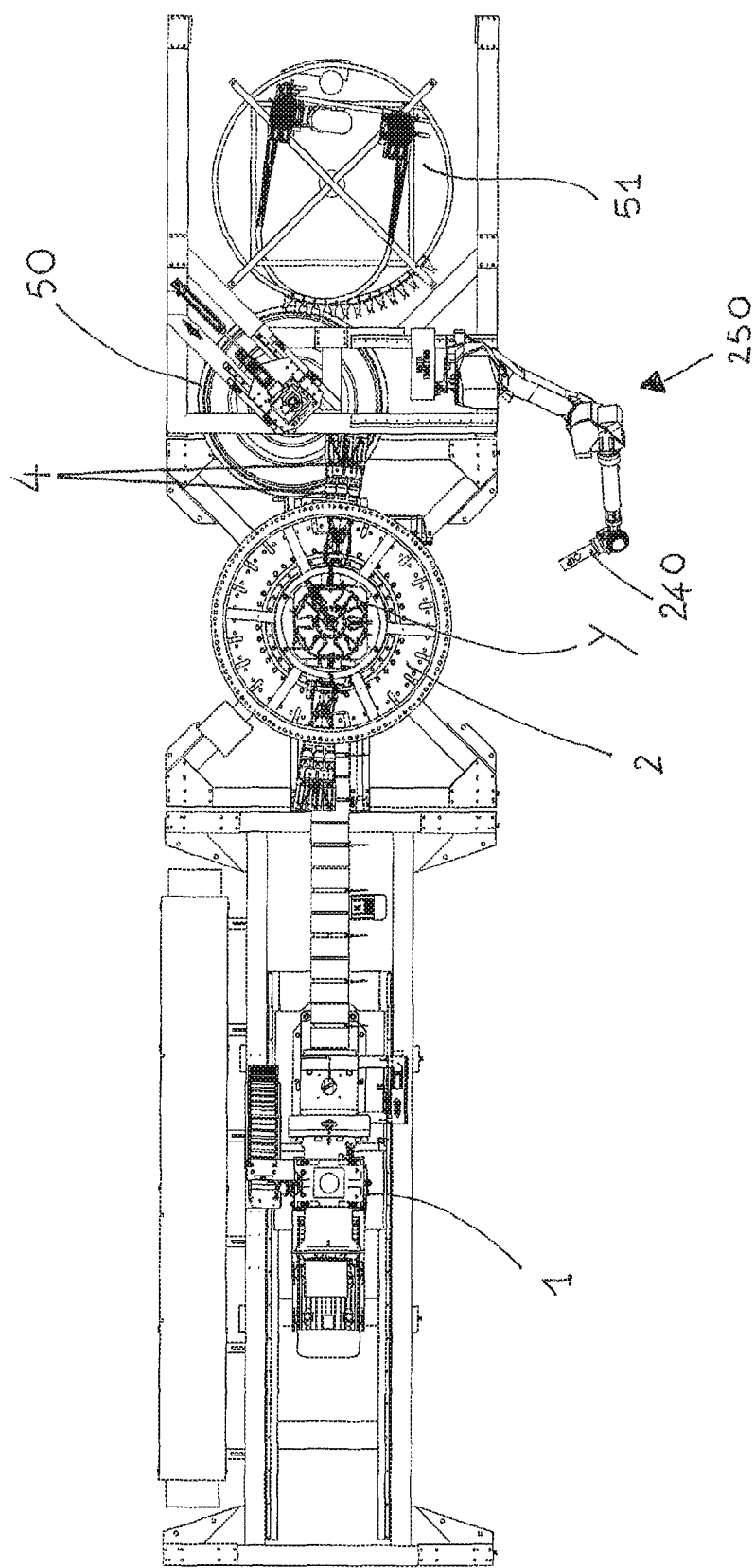
FIG. 1 is a diagrammatic plan view of a thermoplastic preform manufacturing plant in which molds according to the invention are provided.

FIG. 1 is a diagrammatic plan view of an injection-compression plant of the rotational type, for thermoplastic material containers, typically PET preforms for the production of bottles or other containers for food or non-food use.

In this diagram, the injection-compression apparatus is associated with a preform cooling device 51, e.g. with a star conveyor 50, provided with grippers 4, for transferring the preforms from a rotating carousel 2 to the cooling device 51. Such a configuration is typical in a container manufacturing plant of the two-stage type. A person skilled in the art will appreciate that, without departing from the scope of the invention, instead of the preform cooling device 51 a blowing machine can be associated with the injection-compression apparatus, with the corresponding accessory devices of the type known in the art, such as preform transfer, cooling and/or conditioning wheels, heating ovens etc. If needed, other machines, for example used to label the containers and fill them with the intended product, may be inserted in the plant.

Furthermore, various plant components can be arranged in a relative plan position either aligned or grouped with the rotation axes which ideally form a triangle or, more in general, a polygonal to adapt to the space occupation needs of the place where the plant is installed.

The plant in FIG. 1 comprises at least one extruder 1, of known type, the function of which is to plasticize the polymer transforming it from the granular solid state to the fluid state, with the contribution of energy provided by specific heaters and by friction forces which are generated due to the action of the extruding screw, thus producing melted resin.

The plant also comprises the rotating carousel 2 for preform injection-compression molding with can rotate about a vertical axis Y.

A distribution device 3 for distributing the melted resin produced by extruder 1 up to each mold, arranged on the outer periphery of carousel 2, is provided between the extruder 1 and the rotating carousel 2. As the injection-compression apparatus is configured as a rotating carousel 2, the flow rate of melted resin to be supplied must be nearly constant over time, whereby an extruder 1 capable of generating a constant flow rate must preferably be used.

Figure 2:
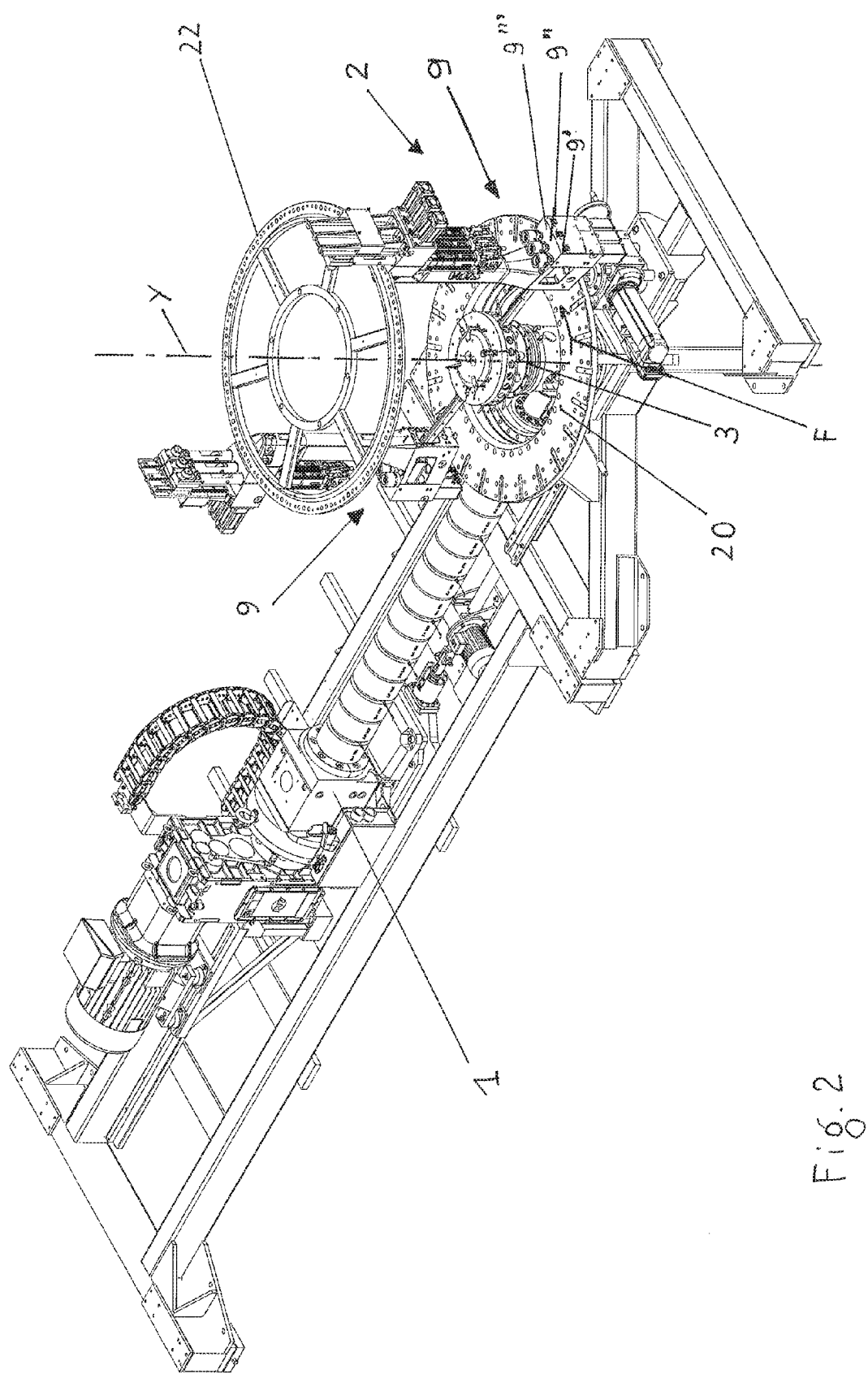
FIG. 2 is a partial axonometric view of the plant in FIG. 1.

The rotating carousel 2, with particular reference to FIG. 2, comprises a horizontal lower disk 20 and an upper disk 22 parallel to the lower disk. Both disks 20 and 22 share the same rotation axis Y, forming an assembly with the ideal shape of a drum. A plurality of injection-compression molds 9', 9", 9'" is arranged along the periphery of the drum, the molds having a substantially elongated shape and each defining a vertical sliding axis Y' (FIG. 4) of the half-molds parallel to the rotation axis Y of carousel 2, and which may rotate, for example, in the direction of arrow F (FIG. 2) or if needed in the opposite direction.

The lower disk 20 and the upper disk 22 are joined to each other by the molding modules 9 so as to contribute to forming the load-bearing structure of the carousel 2 having a high rigidity, and thus capable of withstanding the high loads which are generated during the injection-compression process. The number of injection-compression molds is defined during the step of designing the injection-compression apparatus according to criteria related to the intended productivity rate of the preform and/or finished container manufacturing plant.

Only two molding modules 9, each comprising three injection-compression molds 9', 9", 9'", are shown In FIG. 2, for reasons of clarity of the description, but is understood that the entire periphery of the carousel 2 is occupied by the molds 9', 9", 9'", perfectly equal to one another and divided into a number of modules 9 which is three times lower than the number of molds.

In particular, the solution in FIG. 2 shows an embodiment with molding modules 9 with three molds 9', 9", 9'" along the peripheral surface of the carousel 2; however, modules with a number of molds other than three can be made without departing from the scope of protection of the invention. These solutions are not shown in the figures because they can be easily understood by a person skilled in the art.

A melted resin distribution device 3, shown in greater detail in FIGS. 3, 3a and 3b, is provided in the middle of the carousel 2 at the lower disk 20. The distribution device 3 allows to transfer the melted resin from the single feeding conduit 10 of the fixed extruder 1 to the plurality of molding modules 9 which rotate together with the carousel 2.

The distribution device 3 is advantageously provided with a rotary joint comprising:
  a fixed structure 3' centrally provided with a longitudinal fixed element 23 therein, which extends along axis Y, in which there is provided a passage channel 11 of the melted resin having an appropriate diameter, compatible with the necessary flow rate of melted resin, from 28 to 42 mm, preferably of 32 mm;
  and a movable structure 3", in turn comprising:

a first central rotary element 25, arranged in the upper part of the distribution device 3, above said longitudinal fixed element 23, and integral with the lower, disk 20 of the carousel 2;

a second central rotary element 102, substantially bell-shaped (FIG. 3b), arranged under the first rotary element 25 and integral therewith, provided with a central through cavity, having a cylindrical shape, crossed by the upper portion of the central fixed element 23.

A melted resin passage channel 11' is provided in the first rotary element 25, having the same diameter as the passage channel 11 at a first end thereof and communicating with the latter. The passage channels 11 and 11' are arranged along the Y axis of the carousel 2; the passage channel 11 being considerably longer than the passage channel 11'. Said passage channel 11' is instead provided at a second end thereof with a flaring for connecting to a plurality of radial lateral channels 52, again provided inside said first rotary element 25.

Since, during the rotation of the rotary carousel 2, the melted resin tends to partially exit from the gap between the fixed structure 3' and the movable structure 3" when the resin passes from channel 11 to channel 11', a labyrinth seal 24 advantageously ensures the tightness of the melted resin between said fixed structure 3' and said movable structure 3".

The labyrinth seal 24 is obtained in the space between the inner surface 101 of the cylindrical through cavity in the middle of the second rotary element 102 (FIG. 3b), integral with the first rotary element 25, and the outer surface of the fixed longitudinal element 23. A single- or multi-start spiral groove 103, e.g. with two or four starts, is advantageously provided on the inner surface 101. The spiral groove 103 is a helical groove having the helix inclined in the direction opposite to that of rotation of the rotary elements 25 and 102, and thus of the entire carousel 2, whereby the rotary relative motion of the spirals with respect to the fixed longitudinal element 23 creates a pumping effect which opposes the release of pressurized melted resin from the gap between the fixed structure 3' and the movable structure 3", pressing it upwards and maintaining it within the distribution device 3 itself.

In particular, such an inclined helix is such to oppose to the natural exiting direction of the flow of melted plastic into the gap with its rotary motion. For example, in the case of rotation of the movable structure 3" according to direction F (FIG. 2) the spiral groove 103 is a left-handed helix. In particular, the gap between fixed structure 3' and movable structure 3" has an annular shape, with L-shaped cross section, and is delimited on one side by the lower surface of the first rotary element 25 and by the upper surface of the longitudinal fixed element 23, and on the other side is delimited by the inner surface 101 of the rotary element 102 and by the outer surface of the fixed longitudinal element 23.

This rotary joint allows the mutual relative rotary union between the longitudinal fixed element 23 and the first rotary element 25. On the other hand, the fixed element 23 is fixed to a supporting element 35, which connects to the structure of the plant. A thrust bearing 26 is interposed between the upper movable structure 3", rotating about the Y axis, and the lower fixed structure 3' of the distribution device 3.

The melted resin, coming from the feeding conduit 10 of extruder 1, passes in sequence into the passage channel 11, into the passage channel 11' and into the lateral radial channels 52. Said lateral radial channels 52 of the first rotary element 25, in turn, communicate with the respective lateral conduits 27 which connect the first rotary element 25 to the respective molding modules 9.

Each lateral conduit 27 is provided with a respective central channel 27', having a suitable diameter for feeding the injection-compression molds 9', 9", 9''' with a predetermined amount of melted thermoplastic. Electric resistors 38', 38" and 38''', adapted to maintain the melted resin at a correct temperature so that the resin can reach the modules 9', 9", 9''' at the design temperature for preform molding, are advantageously arranged along the various conduits crossed by the melted resin inside the distribution device 3.

Each central channel 27' of the lateral conduits 27 is connected to a manifold 28 (FIGS. 12a, 12b, 13a, 13b), obtained on the injection block 29, which by means of an appropriate channeling circuit communicates with the respective molding cavities 41', 41", 41''' arranged on corresponding molding module 9.

Although reference is made in this part of the description for the sake of brevity to a single molding module 9 provided with three molds 9', 9", 9''' and, in detail, to a single mold 9', it is understood that all the molds and the molding modules which are included in the rotary carousel 2 have the same functional and structural features, unless specified otherwise. In the embodiment shown here, the plurality of molding modules 9 is in number equal to one third of that of the molding cavities 41', 41", 41'''.

Figure 4:
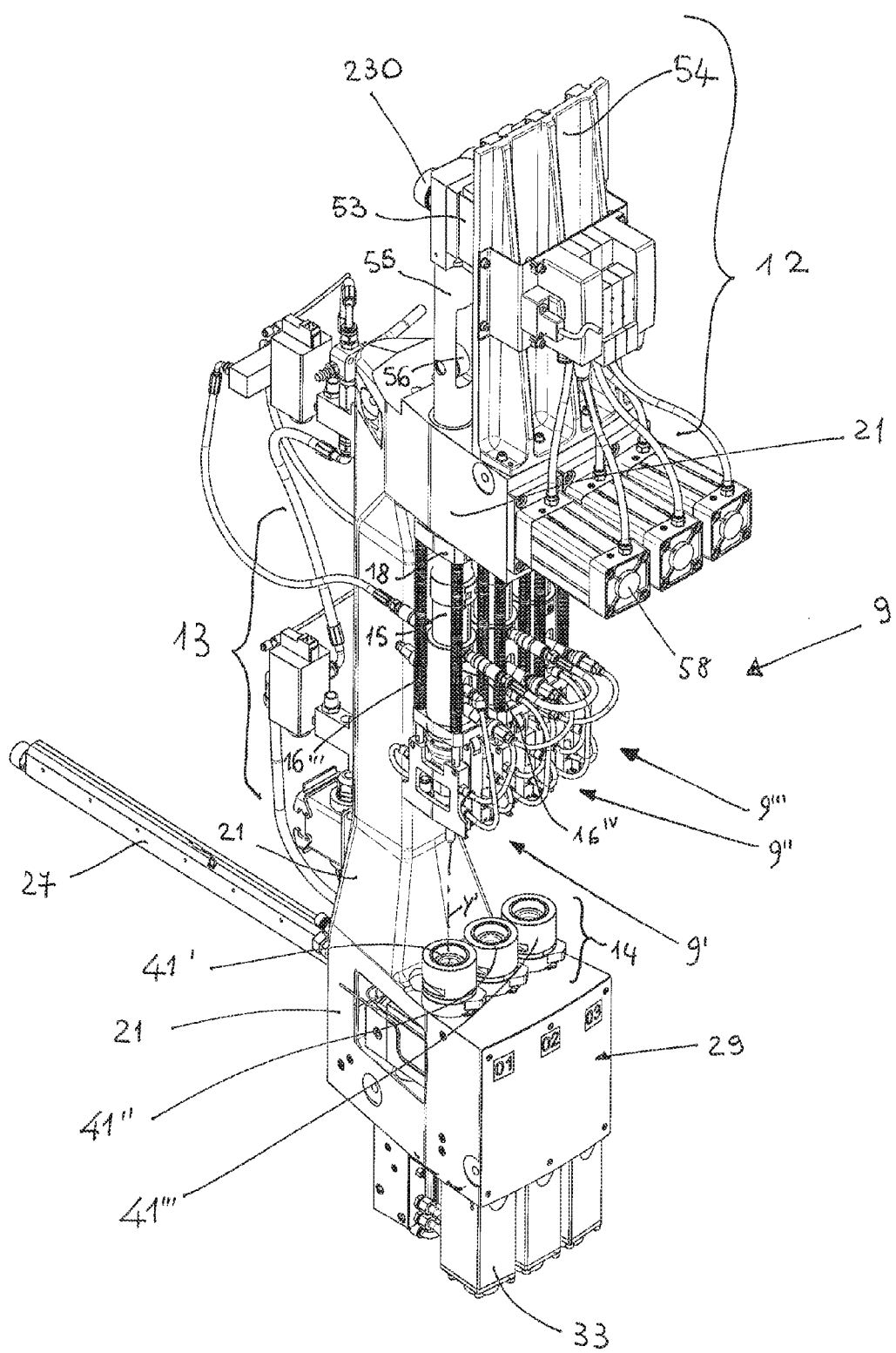
FIG. 4 is an axonometric view of a molding module comprising molds according to the invention.
Figure 5:
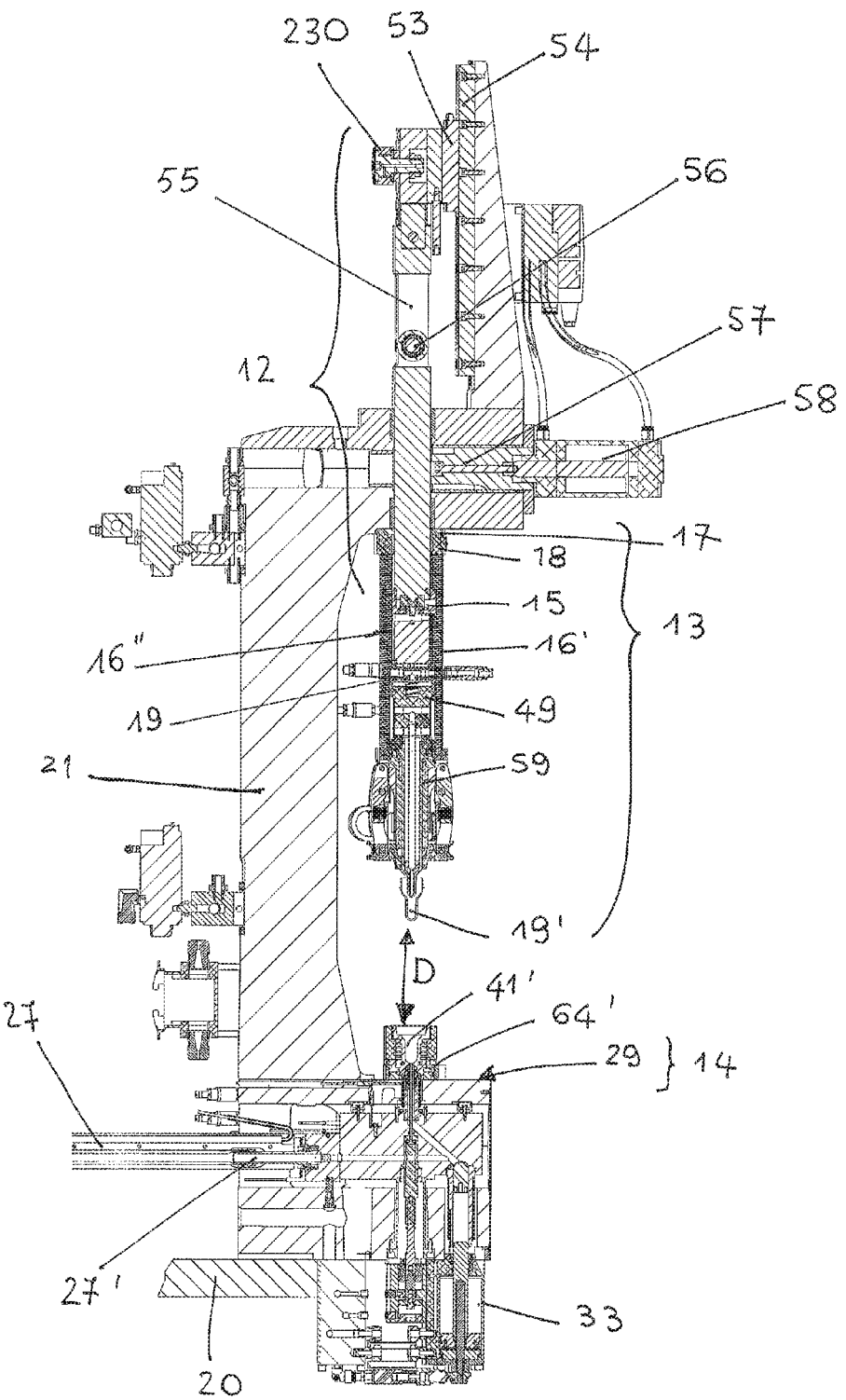
FIG. 5 is a side section view of the molding module in FIG. 4.

The molding module 9 is thus described in greater detail with reference in particular to FIGS. 4 and 5. The molding module 9 comprises a supporting element, e.g. in the form of a frame 21 with very solid, rigid, substantially C-shaped, structure, which is fixed integrally on the upper part thereof to the upper disk 22 and on the lower part thereof to the lower disk 20. Its rigidity allows to contrast the reaction forces produced by the forces associated with the injection-compression molding operation. Three molds 9', 9", 9''', which are mutually equal and form the module 9, are fixed on the open part of the frame 21 facing in radial direction towards the outside of the carousel 2.

The mold 9', object of the present invention, consists of three parts: the upper part 12, the central part 13 and the lower part 14.

For reasons of clarity, the upper part 12 is conventionally the part of the mold 9' which remains connected to the frame 21 of the module 9 during the current maintenance operations or format change operations of the molding cavity 41'.

The central part 13 is conventionally the part of the mold 9' which can be replaced with a relatively simple, rapid operation when it must be replaced for reasons of wear or format change of the preforms to be manufactured. The central part 13, during the current molding operations, remains fixed and integral in block with the upper part 12 and both parts 12 and 13 move together along direction D (FIG. 5) to close and open the molding cavity 41'.

The lower part 14 is conventionally the part of the mold 9' integrally fixed to the frame 21, which does not move during the current molding operations and can be replaced by a relatively simple, rapid operation when the molding cavity 41' needs to be replaced for reasons of wear or format change of the preforms to be manufactured.

The upper part 12 comprises a longitudinal rod 55 sliding vertically in a hole-guide of the upper part of the frame 21, and integral on the upper end thereof with a runner 53 which can slide in the direction of the arrow D along the guide 54 integrally fixed to said upper part of the frame 21. The rod 55 includes a wheel 230, or equivalent element, which acts as a tappet capable of following a cam surface (not shown), which controls the vertical movement of the upper part 12 and central part 13 of the mold 9' during the molding operation.

A blocking and unblocking wedge 57 for blocking or unblocking the rod 55, controlled by a pneumatic actuator 58, allows to keep the upper part 12 and the central part 13 fixed in a lowered position (FIG. 14), by acting on a further wheel 56 provided on the rod 55, during the step of molding the preform. When the wedge 57 is instead retracted from the specific seat in the rod 55 under the action of the pneumatic actuator 58 (see position in FIGS. 5, 15, 16 and 17), it allows the vertical sliding of the upper part 12 and central part 13 to perform other steps of the molding cycle, described below.

The central part 13 comprises (FIGS. 6, 7a, 7b):
- a bayonet coupling 15 to join to the upper part 12, so as to allow a quick attachment and detachment of the central part 13 from the upper part 12, e.g. during preform format change operations;
- a sliding guiding cage constituted by four rods 16', 16", 16''', 16$^{iv}$, associated with respective return springs 200 and fixed on the upper part to a first plate 18 and on the lower part to a base structure 18", the first plate 18 being provided with a central through hole 20 through which the rod 55 passes, the rod being connected at the lower end thereof to the bayonet coupling 15 provided inside the guiding cage, allowing a relative sliding movement between the bayonet coupling 15 and the first plate 18;
- a cylinder 19, such as a pneumatic cylinder or other equivalent cylinder, having an inner cavity, defining a chamber in which a piston 49 is accommodated, said cylinder 19 being fixed by an upper end thereof to the bayonet coupling 15, possibly with an interposed extension 220, and being provided at a lower end thereof with a flat part, e.g. in the shape of a second plate 18', preferably coinciding with the same flat lower end of the cylinder 19 itself, sliding along the four rods 16', 16", 16''', 16$^{iv}$; said return springs 200, helical and coaxial to said rods, being fixed at a first end thereof to the first plate 18 and at a second end thereof to the second plate 18', either integral with or belonging to part of the cylinder 19, which can move parallel with respect to the first plate 18;
- a punch or core 59, fixed integrally to the piston 49, which forms a component complementary to the molding cavity 41' to complete the mold of the preform, delimiting the inner shape of the preform;
- cams 8', 8", fixed integrally to the guide element 59' of the punch 59, external and coaxial to the latter;
- the base structure 18", to which the four rods 16', 16", 16''', 16$^{iv}$ are fixed, comprising a system of two lateral levers (or rocker arms) 67', 67", hinged on respective pins 68', 68" of the base structure 18" and onto which respective tappets 69', 69" are fixed which follow the cams 8', 8"; said levers 67', 67" control the opening and the closing of two half-lips or half-collars 66', 66" (FIGS. 7a and 7b) which define, when close (FIG. 7a), a collar defining the negative cavity which molds the neck zone of the preform, allowing to complete the closing of the molding cavity 41' when the preform must be molded.

A spring 63, inside the cylinder 19, produces a slight thrust on the punch 59 to promote a regular filling, by the melted resin, of the molding cavity 41' during a first step of molding. The bayonet coupling 15, shown in greater detail in FIGS. 10 and 11, comprises a sleeve 60 arranged about a clutch base 61 with a constraint which allows an angular rotation thereof about the axis Y', but is integral in the direction parallel to the axis Y' with the clutch base 61. The sleeve 60 is provided with teeth 62', 62", 62''', directed towards the interior of the cavity thereof, which are shaped to be inserted into corresponding longitudinal grooves of the longitudinal rod 55 and slide into an annular groove of said longitudinal rod 55 with a relative rotation of about 60° between rod 55 and sleeve 60 in the direction of the arrow R. Thereby, it is possible to attach and detach the central part 13 from the upper part 12 of the mold 9' rapidly in order to carry out assembly/disassembly operations or to change the preform format.

The lower part 14 of the mold 9' comprises the molding cavity 41' and a second bayonet coupling 64' (FIGS. 8, 9), provided on the supporting frame 21, which cooperates with a corresponding clutch 65 (FIGS. 6, 7a) arranged at the base of the cavity 41'. Thereby, the replacement rapidity of the cavity 41' is ensured for maintenance or for format changing.

Figure 6:
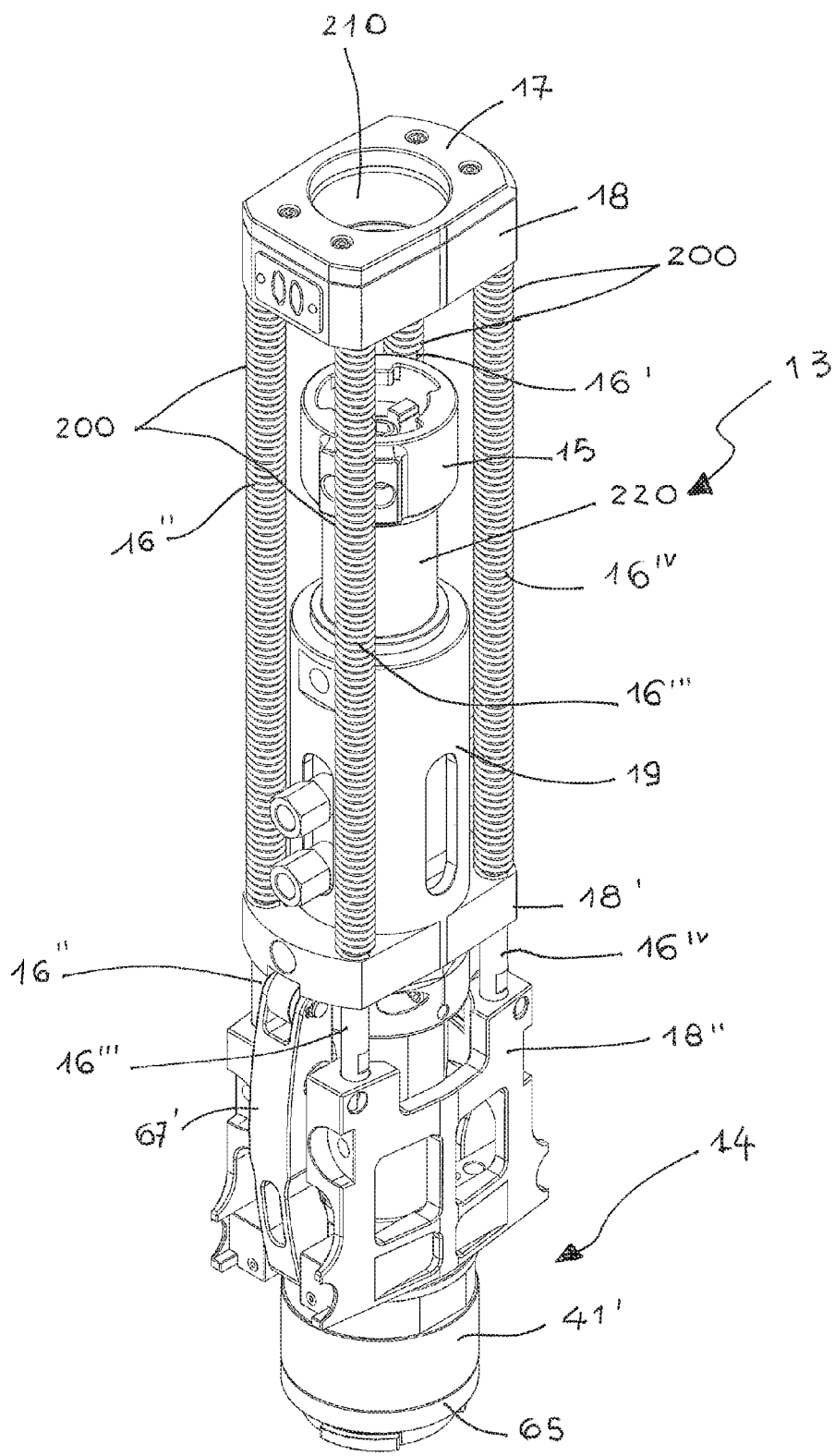
FIG. 6 is an axonometric view of parts of a mold according to the invention.
Figure 7A:
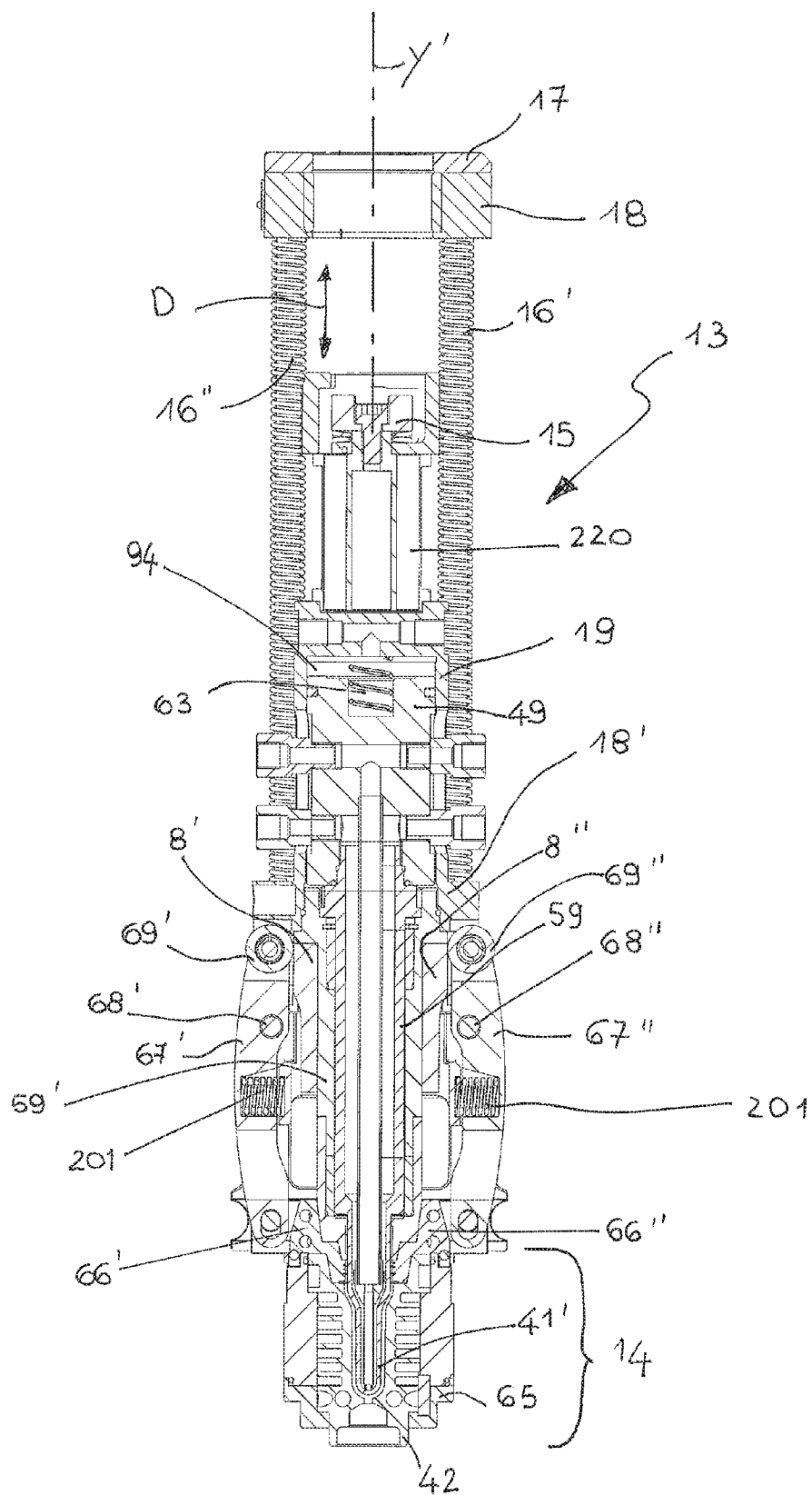
FIG. 7a is a section view of the mold in FIG. 6 in a first operating position.
Figure 7B:
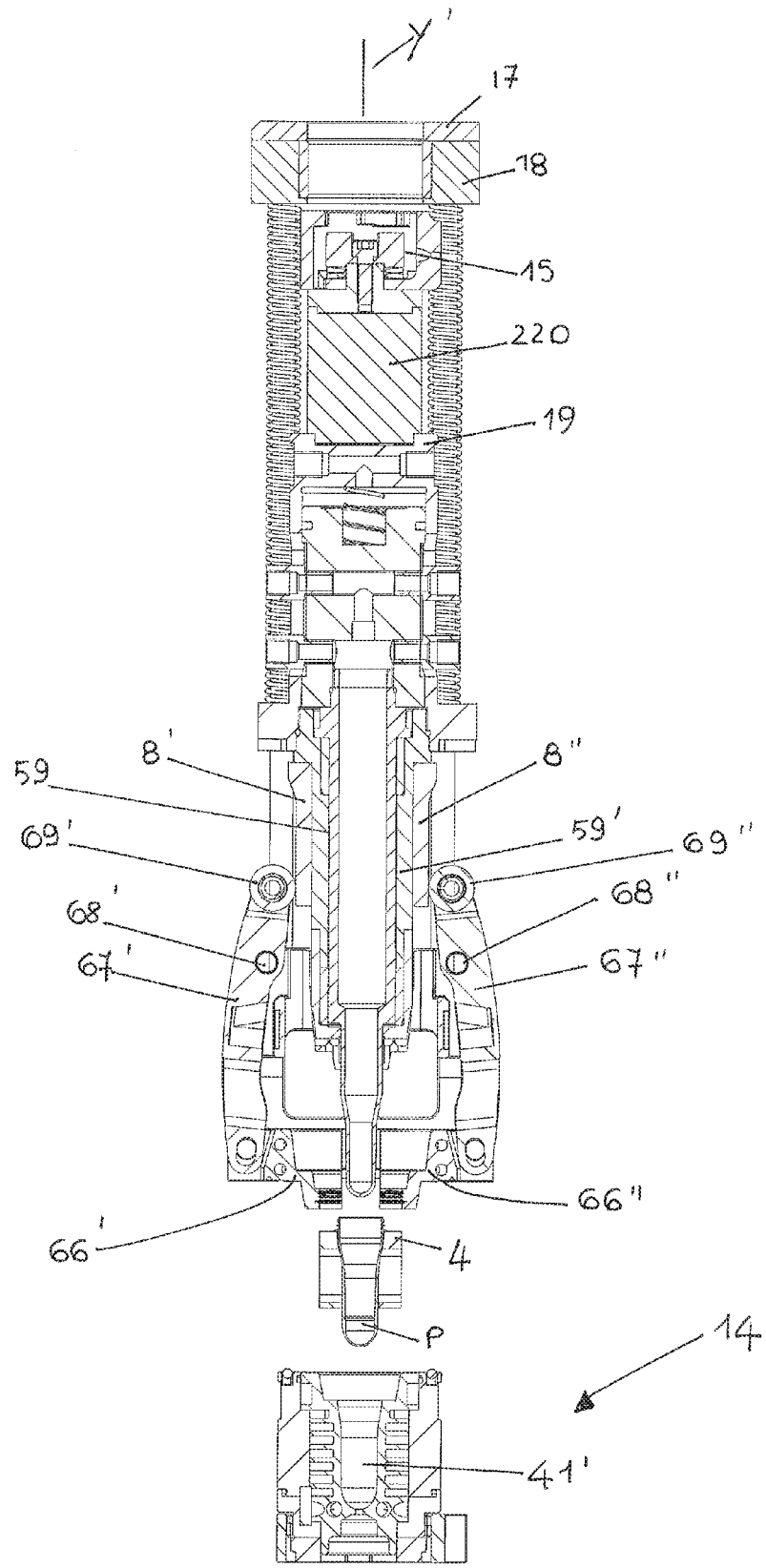
FIG. 7b is a section view of the mold in FIG. 6 in a second operating position.

It is worth noting that in order to ensure a format change comprising a higher number of preform lengths the rod 55 must be provided with at least one extension, which may be either added or removed to reach the necessary length. Alternatively or in combination, said at least one extension 220 may be arranged between the bayonet coupling 15 and the cylinder 19 (FIGS. 6 and 7).

When the cavity 41' is opened, the central part 13 moves away from the lower part 14 upwards in the direction indicated by D. Once the first plate 18 abuts, by means of the bumper 17, preferably made of rubber, against the upper part of the C-shaped frame 21, the rod 55 is raised further by means of the cam surface acting on the wheel 230, thus moving the punch 59 and consequently the cams 8', 8" upwards by a relative motion with respect to the pierced plate 18, which at that time remains stationary together with the base structure 18", and thus together with the fulcrums 68', 68" which maintain the levers or the rocker arms 67', 67" at the same predetermined distance from the pierced plate 18.

The relative movement of the cams 8', 8" and the levers 67', 67" separates the two half-collars 66', 66" (FIG. 7b) with respect to each other by virtue of the fact that the tappets 69', 69" of the levers 67', 67" follow the profile of the cams 8', 8", releasing the neck of the preform, which may be extracted from the punch 59 by using specific grippers provided on the transfer star conveyor 50. The return springs 201 (FIG. 7a) keep the tappets 69', 69" into contact with the cams 8', 8". The description made for the mold 9' is repeated in similar manner for the molds 9" and 9''' of the molding module 9 and is omitted for the sake of brevity of the description.

The injection block 29 is described in greater detail with reference to FIGS. 12a, 12b and 13a, 13b, which show the steps of loading of the resin dose and the steps of filling of the molding cavity 41" with the resin dose for each molding cycle, respectively. Although reference is made to a molding cavity 41", it is apparent that the block 29 has other two molding cavities 41' and 41''', perfectly equal to the cavity 41" with the same accessory components described for the cavity 41" and which are filled at the same time.

The resin is injected into the molding cavity 41" by means of the thrust of a piston 39 sliding in the respective dispensing injector 34 connected to the hot chamber 30. The piston 39 is actuated by a pneumatic cylinder 33, which is controlled in turn by a valve (not shown in the figures). Where necessary, appropriate heating means, e.g. resistive bands, are provided to maintain the resin at the design temperature in the various parts of the injection block 29.

An injection nozzle 31 is arranged at the top of the hot chamber 30 with a vertical axis Y' thereof and is also heated by an electrical resistor, e.g. of the band type. Such an injection nozzle 31 allows the dose of melted material to pass into the molding cavity 41" through the hole 42. Preferably, said hole 42 has a diameter of 3-5 mm, preferably of 4 mm.

The hot chamber 30 is crossed by a first conduit 70 connected to the manifold 28 which receives the resin from one or more lateral conduits 27. This first conduit 70 communicates with a second conduit 71, also within the hot chamber 30 and connecting the tank 72 of the dispensing injector 34 with the injection conduit 73 of the injection nozzle 31. The hole 42 is either opened or closed during the operations by means of a shutter 32.

Advantageously, a mechanism with a single actuator for the filling operation of the respective molding cavity and the filling operation of the respective dispenser 34 is provided for each molding cavity 41', 41", 41''' of each module 9. However, in this embodiment, there is only one electrovalve which controls the three pneumatic cylinders 33, and so the three molding cavities 41', 41", 41''' of each module 9 carry out the same step of each work cycle at the same time. The mechanism which actuates the switching between the step of filling the dispenser 34 and the step of filling the molding cavity can be a valve 36, e.g. of the spool or shutter type, capable of either opening or closing the passage of melted resin from the conduit 70 towards the tank 72 for filling the dispensing injector 34. Said valve 36 is actuated by means of an actuation device 37, arranged at a first end of the valve 36. The shutter 32 is integrally connected to a second end of the valve 36, opposite to the first end. The actuation device 37, the valve 36 and the shutter 32 are arranged longitudinally and preferably along a same axis Y'.

The actuation device 37 comprises two separate cylindrical chambers 74, 75 provided with respective pistons 76, 77 integral with each other. The lower cylindrical chamber 75 is provided with two compressed air inlet/outlet conduits 78, 79.

An adjustment ring nut 44 of the position of the abutment plate 43 of the dual-acting piston 40 to adjust the weight of the melted resin dose accurately, also to the hundredth of a gram, is provided on the bottom of the cylindrical chamber of the pneumatic cylinder 33 of the dispensing injector 34. The position of said abutment plate 43 can be set singularly for a better preform calibration.

The dual-acting piston 40 of the pneumatic cylinder 33 is actuated by a combination of pressures and counter-pressures generated by the compressed air introduced into the upper 45 and lower 46 chambers and by the melted resin coming from the extruder 1 by means of the channel 70 of the hot chamber 30.

During the step of loading the resin in the dispenser, corresponding to the descent of piston 40 along the direction shown by arrow G, the pressure of the melted resin pushed by the extruder into tank 72 operates on the piston 39 and prevails with respect to the combination of the compressed air pressures introduced into the upper chamber 45, appropriately adjusted in the range from 10 to 40 bar, and into the lower chamber 46, always connected to the air circuit preferably at 40 bar.

During the step of injecting the melted resin, corresponding to a raising of piston 40 along the direction indicated by G, the high pressure compressed air, preferably at 40 bar, works in the lower chamber 46, coming from the inlet fitting 48, while the upper chamber 45 of the same cylinder 33 is connected by means of a control valve to the low-pressure (0-8 bar) air recovery circuit by means of the outlet fitting 47.

The coordinated movement of the valve 36, of the shutter 32 and of the dispensing injector 34, as well as the calibration of the abutment plate 43, allows to dose the amount of melted resin needed to be introduced into the molding cavity 41" accurately according to the design of the preform to be manufactured. The coordinated movement of the injection block is actuated by using electrovalves driven by programmable systems.

Figure 12A:
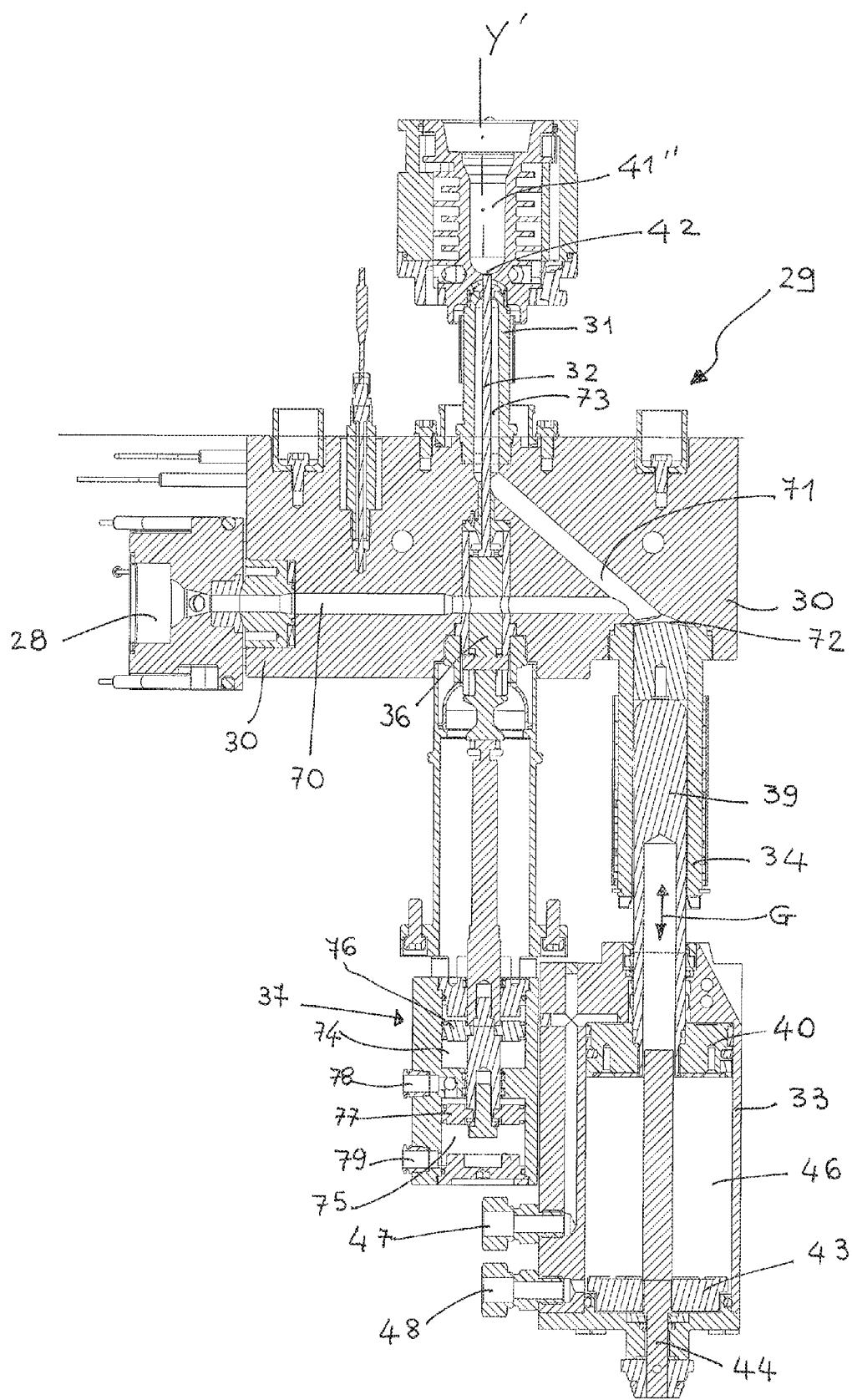
FIGS. 12a, 12b, 13a and 13b are section views of a thermoplastic material injection block incorporated in the plant in FIG. 1 in the various operating positions.
Figure 12B:
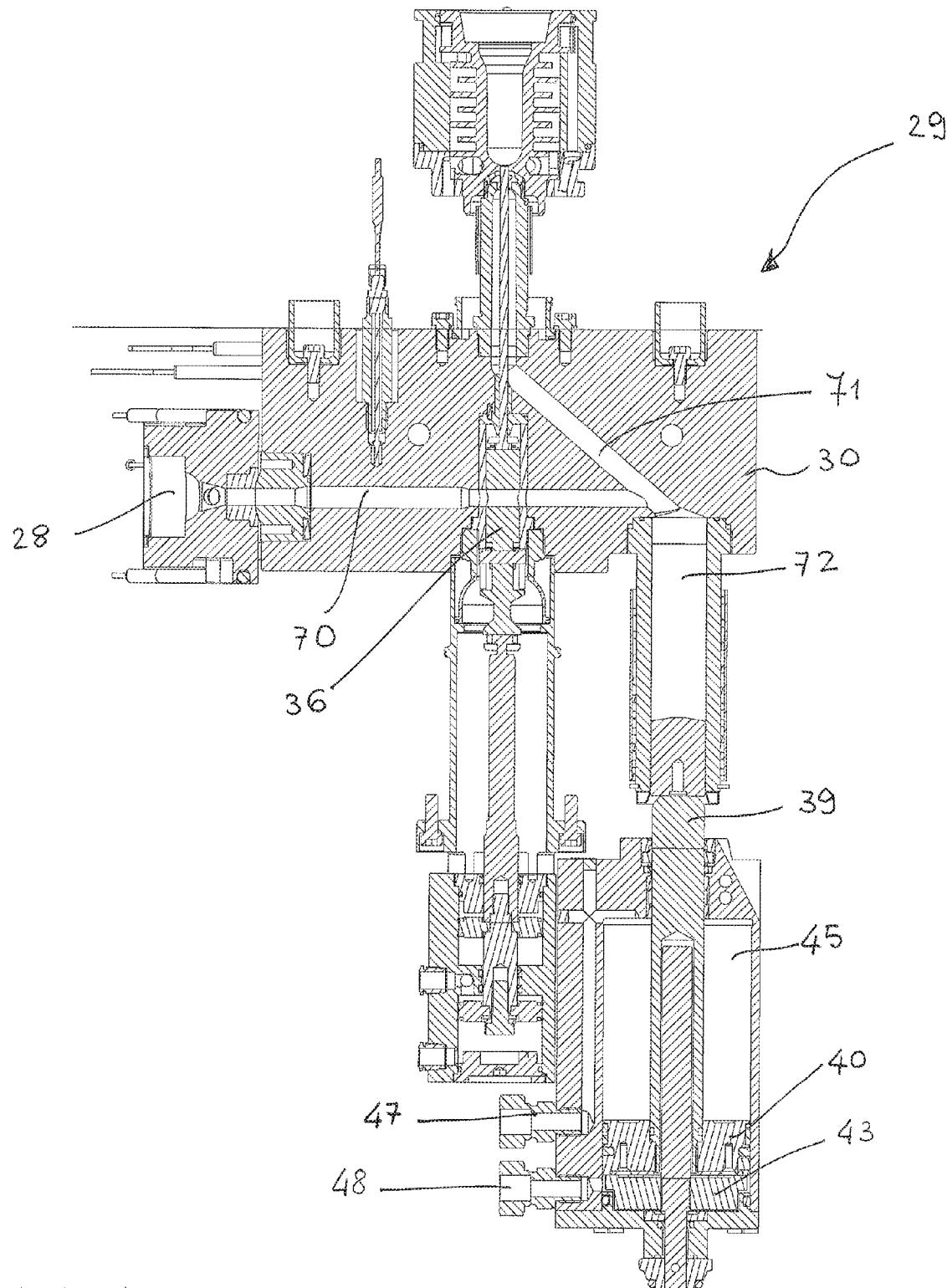

In particular, the valve 36 is opened by means of the actuation device 37, leaving the conduit 70 open, when the piston 39 of the dispensing injector 34 is in advanced position, as shown in FIG. 12a. The opening of the valve 36, by means of its upward displacement, determines the closing of the hole 42 of the injection nozzle 31 by means of the shutter 32 and a retraction of the dual-acting piston 40 of the dispensing injector 34 under the action of the pressurized melted resin front coming from the hot chamber 30 and which fills the tank 72.

After the dual-acting piston 40 reaches the abutment plate 43, the step of loading is completed and the dispensing injector 34 is ready to inject the dose into the molding cavity 41", as soon as the respective command is imparted.

Figure 13A:
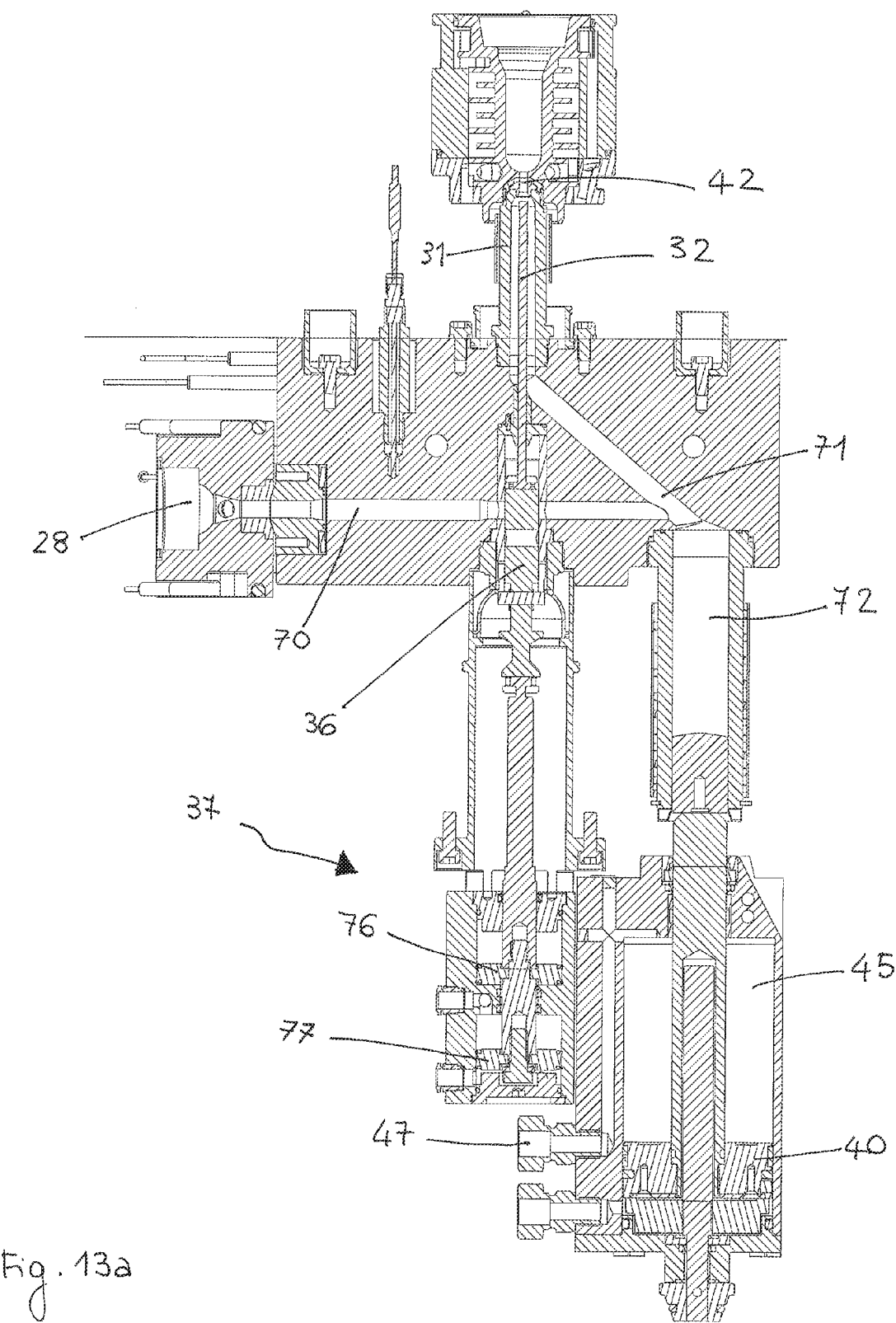
Figure 13B:
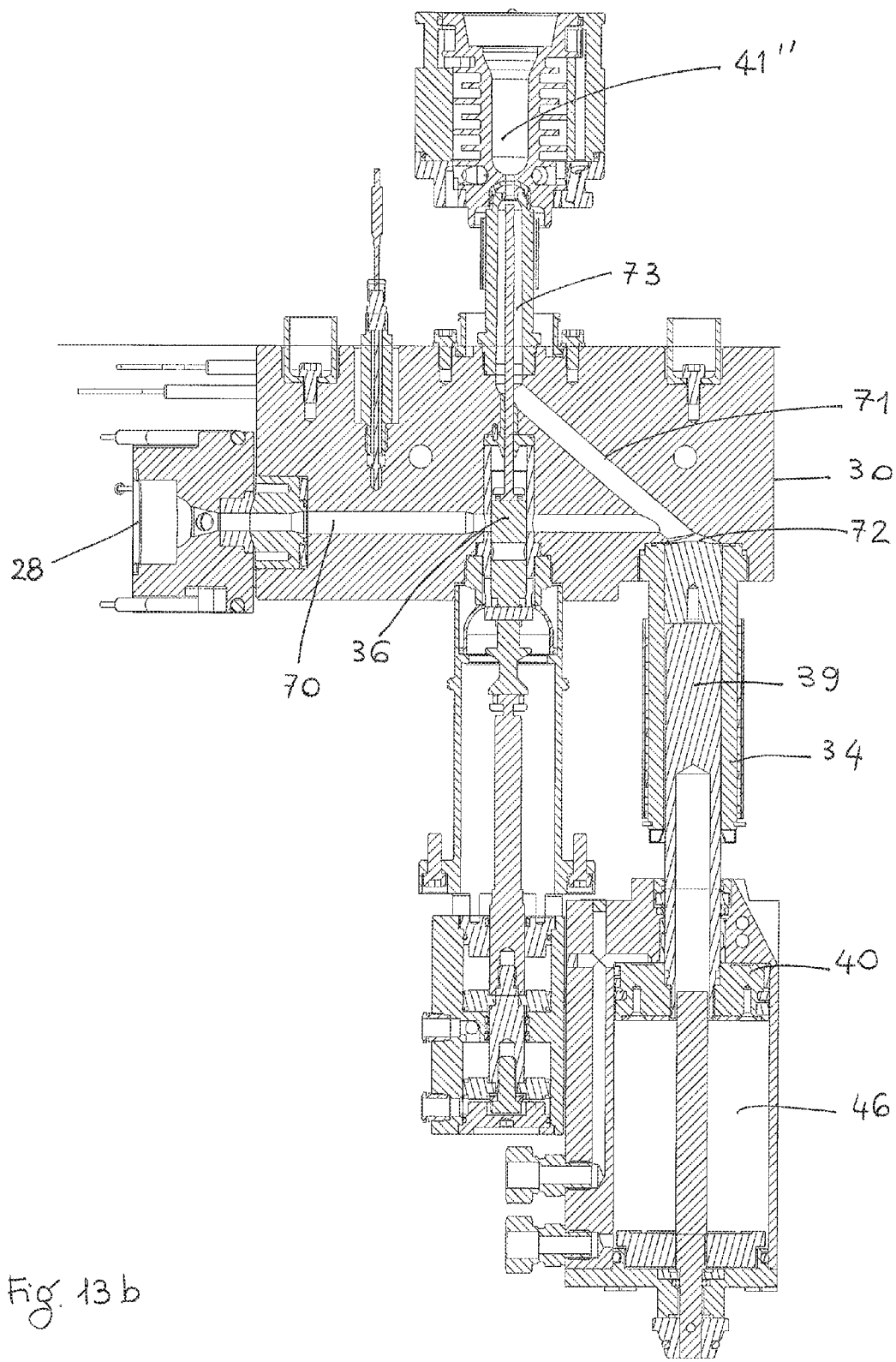

The step of injecting includes the closing of the valve 36, by means of a downward displacement thereof determined by the actuation device 37, and the simultaneous opening of the shutter 32, which moves down thus releasing the outlet section of the nozzle 31 (FIG. 13a), i.e. the hole 42, and the subsequent injection movement of the dispenser 34 by means of the dual-acting piston 40 (FIG. 13b). The valve 36 is closed during the advancement of the piston 39 of the dispensing injector 34, and therefore the melted resin is forced to pass through the conduit 71 and the injection conduit 73 to reach the interior of the molding cavity 41".

Each lateral conduit 27 is provided with two spherical joints 203 (FIG. 3a) on the ends, by means of which it is connected to the manifold 28 on one side and to the rotary element 25 on the other side in order to allow to compensate the relative displacements between lower disk 20 and the rotary element 25 of the distribution device, mainly due to thermal expansions, by means of a rotary displacement. In a top plan view (not shown), the lateral conduit 27 is arranged not precisely aligned in radial direction with respect to the rotation axis Y, instead it is arranged slightly offset with respect to the axis Y, i.e. the ideal axis of the conduit 27 ideally never intersects the centre of rotation of the carousel 2, but the ideal line that it defines passes at a predetermined distance from this centre. This arrangement (shown in FIG. 2) allows to take into account the thermal expansions of the lateral conduit 27 both in radial and in vertical sense. Such a arrangement, as explained above, is the same for each lateral conduit 27 of each molding module 9 of the carousel 2. In an alternative variant, each molding module 9 may include as many lateral conduits 17 as the molds in the module.

According to a preferred variant of the rotary carousel 2, extruder 1 acts as a volumetric pump to provide the flow rate of melted resin required at an outlet pressure preferably between 50 bar and 200 bar. Such a pressure is sufficient to move the melted resin inside the entire internal channeling of the distribution device 3, of the lateral conduit 27 of each molding module 9, of the respective hot chambers 30, considering that the single passage channel 11 in the distribution device 3 can feed three dispensing injectors at each molding cycle in each molding module 9.

A preferred maintenance temperature of the melted resin inside the various channelings is 270° C. and is ensured by means of controlled electric resistors arranged in the points where needed. Given this working temperature of the resin, the distribution device 3 is water-cooled to maintain the temperature of the thrust bearing 26 at less than 80° C. Furthermore, all the resin distribution system is preferably externally coated with an insulating material to limit the undesired heat loss and improve the energy efficiency of the entire plant.

The transfer star conveyor 50 transfers the manufactured preforms, by means of a plurality of grippers 4 fixed to the transfer star conveyor 50, in sequence from the rotary carousel 2 to the preform cooling device 51, where they are either cooled or thermally conditioned (FIG. 1).

The molding process comprises a sequence of steps which are carried out at the same time in the three molding cavities 41', 41", 41''' of the module 9.

The first step (FIG. 14) is the step of molding the preforms during which a downwards movement of rod 55 in direction D, which controls punch 59, is performed. The mold 9' is blocked by the pneumatic wedge 57 and the high pressure air, in the order of 30-35 bar, is inserted in the compensation chamber 94 of the cylinder 19. The melted resin inside the cavity 41' is thus subject to the maintenance pressure, which depends on the ratio of the areas of the compensation chamber 94 and the punch 59. The thermal cooling is carried out with refrigerated water which runs in the conduits provided for this purpose in the mold elements in contact with the resin, i.e. cavity 41', punch 59 and half-collars 66', 66". During this step the volume recovery due to the variation of density by thermal effect is also performed by the lowering of the punch 59 caused by the high-pressure air in the compensation chamber 94. Such a compensation chamber 94 is indeed pressurized to allow the step of compressing so as to compensate for the contraction of the melted resin in the molding cavity 41' during the step of cooling the preform.

During this step, the spool valve 36 inside the hot chamber 30 is open to allow the filling of the tank 72 with the melted resin.

The second step (FIG. 15) is the step of opening the mold and follows the cooling and maintenance cycle of the preform P. In order to extract the preform from the cavity 41', mold 9' is unblocked by retracting the pneumatic wedge 57 and the lifting of rod 55 along direction D is carried out. The required opening stroke is always constant, and preferably of 300-400 mm, e.g. of 330 mm, and does not depend on the type of molded preform.

At the same time, the dispensing injector 34 must have completed its loading for the following cycle and the melted resin therein is maintained at a counter-pressure of about 10 bar due to the thrust of the pneumatic cylinder 33 which controls the injector. At the end of this second step, the first plate 18 goes into contact with the upper part of the frame 21: a subsequent lifting of the rod 55 translates into an opening command of the half-collars 66', 66".

The third step (FIG. 16), defined as the first step of extracting the preform, provides for the detachment of preform P from punch 59 by actuating the half-collars 66', 66" which hold the neck of the preform while unsticking the latter from punch 59, a few fractions of a second before the half-collars 66', 66" are detached from each other in the following step.

The fourth step (FIG. 17), defined as the second step of extracting the preform, provides for the detachment of the half-collars 66', 66" from each other and the falling of preform P into the space defined between the closed arms 90', 90" of the gripper 4 underneath.

These extraction operations of the preform P include synchronizing, by means of electromechanical means, the upward movement of the punch 59 with the horizontal opening movement of the half-collars 66', 66". Thus, the presence of the gripper 4 (FIG. 15) is ensured under the preform when the preform P is released. Subsequently, the displacement of the preform P by means of the gripper 4 allows to close the cavity 41' again by lowering the rod 55 in the subsequent step.

In the fifth step, defined as the step of closing mold 9' and of filling the molding cavity 41', the closing of mold 9' is completed by means of the lowering movement of rod 55 accompanied by the insertion of punch 59 and by joining the half-collars 66', 66" which couple with the lead-in cone of cavity 41'. Once the closing of cavity 41' has been completed, the pneumatic wedge 57 is inserted in the locking position of mold 9', impressing a force of about 2-3 t according to needs; this force is adjusted by varying the pressure of the air inserted into the pneumatic actuator 58.

Figure 14:
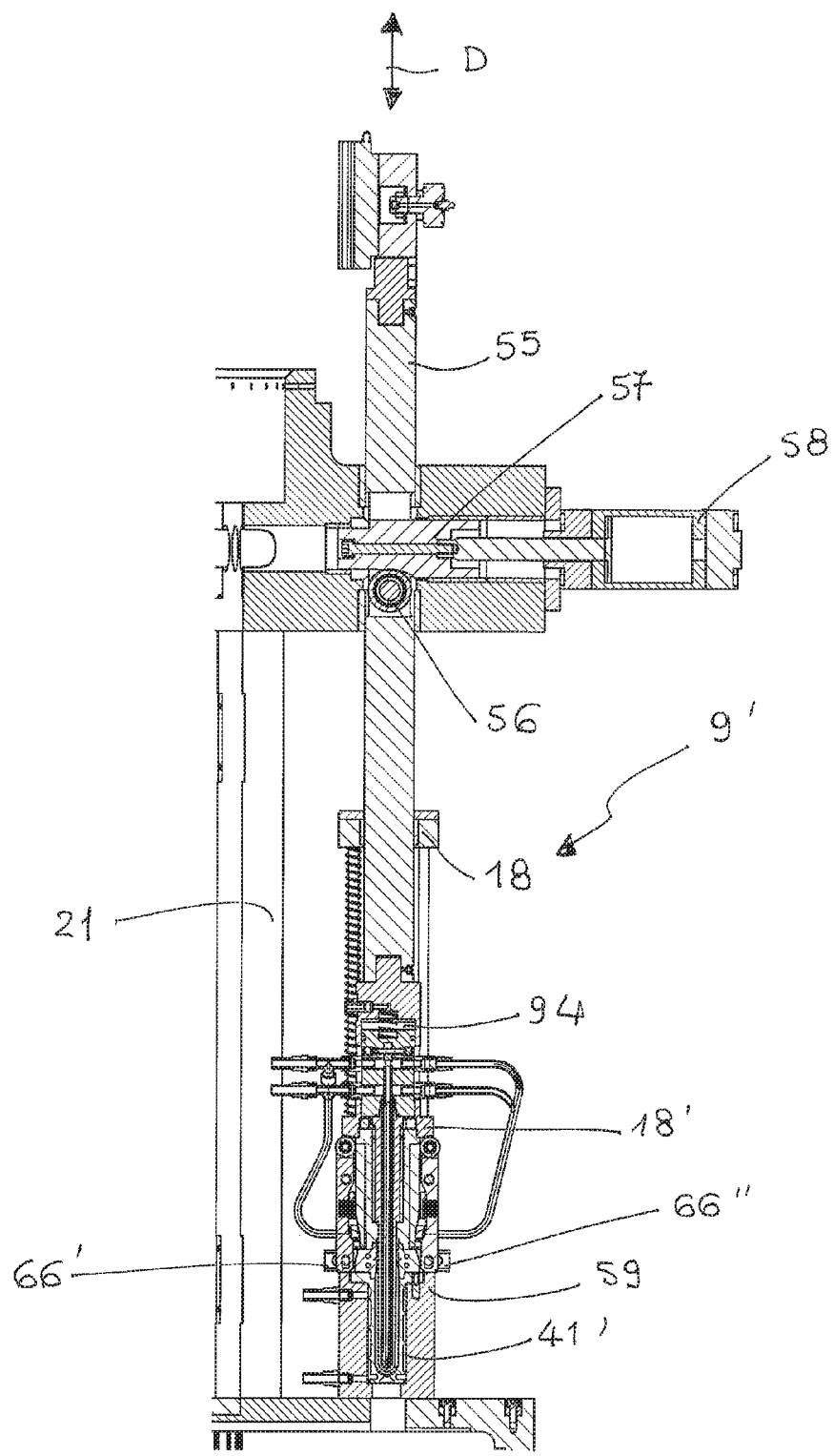
FIGS. 14, 15, 16 and 17 are section views of a mold according to the invention in different operating positions.
Figure 15:
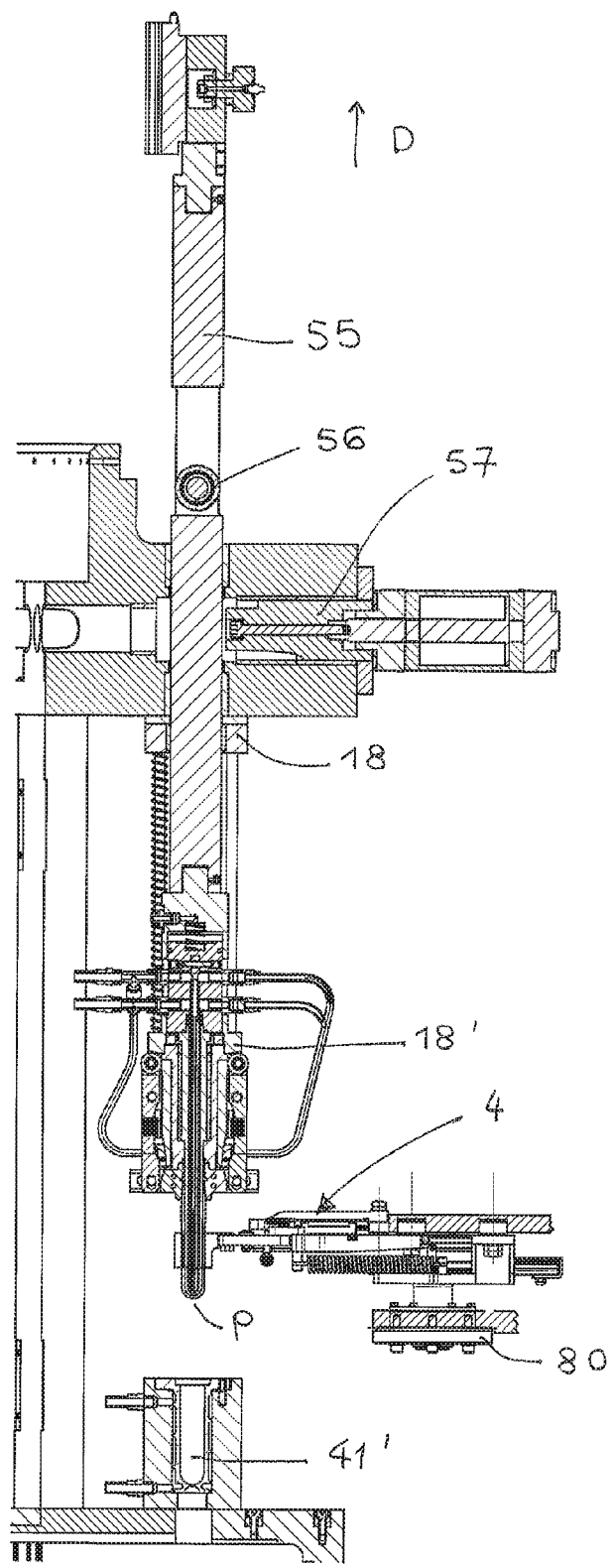
Figure 16:
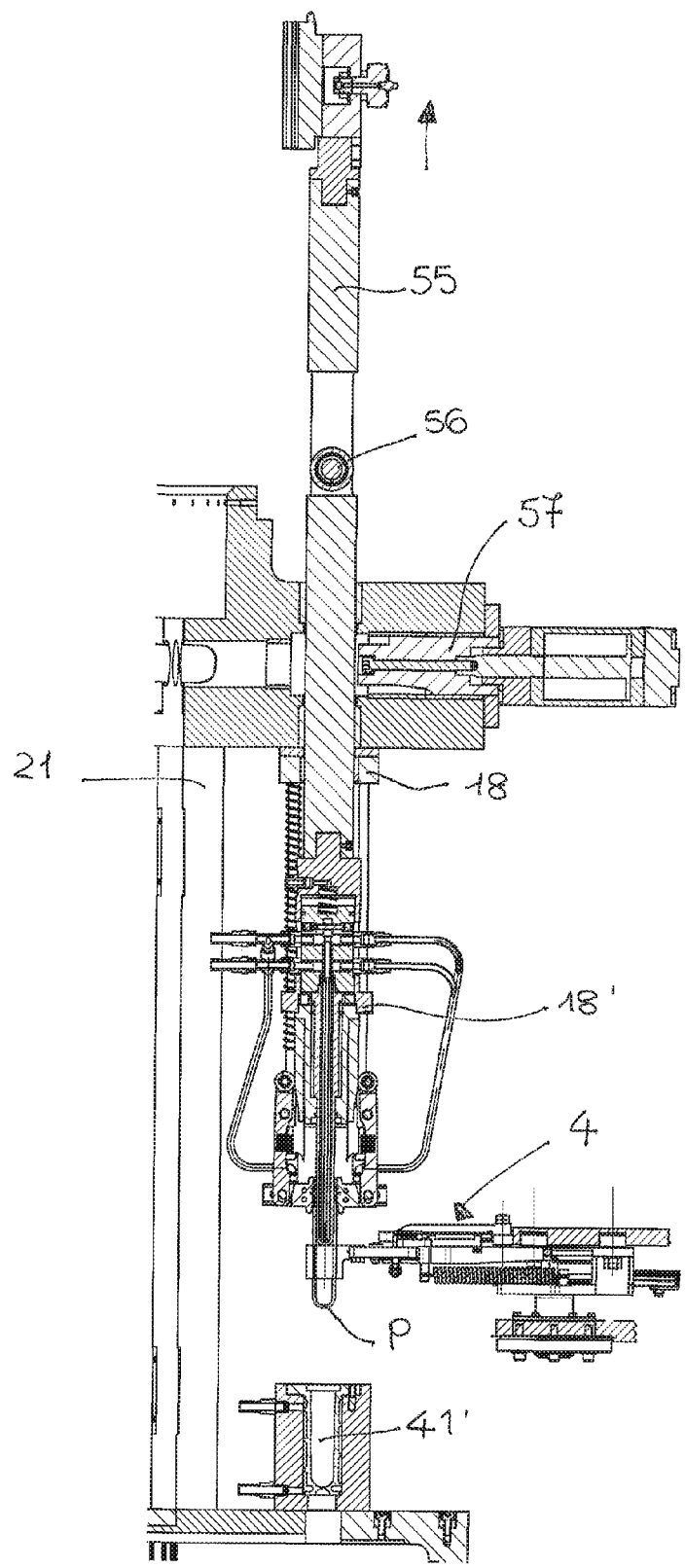
Figure 17:
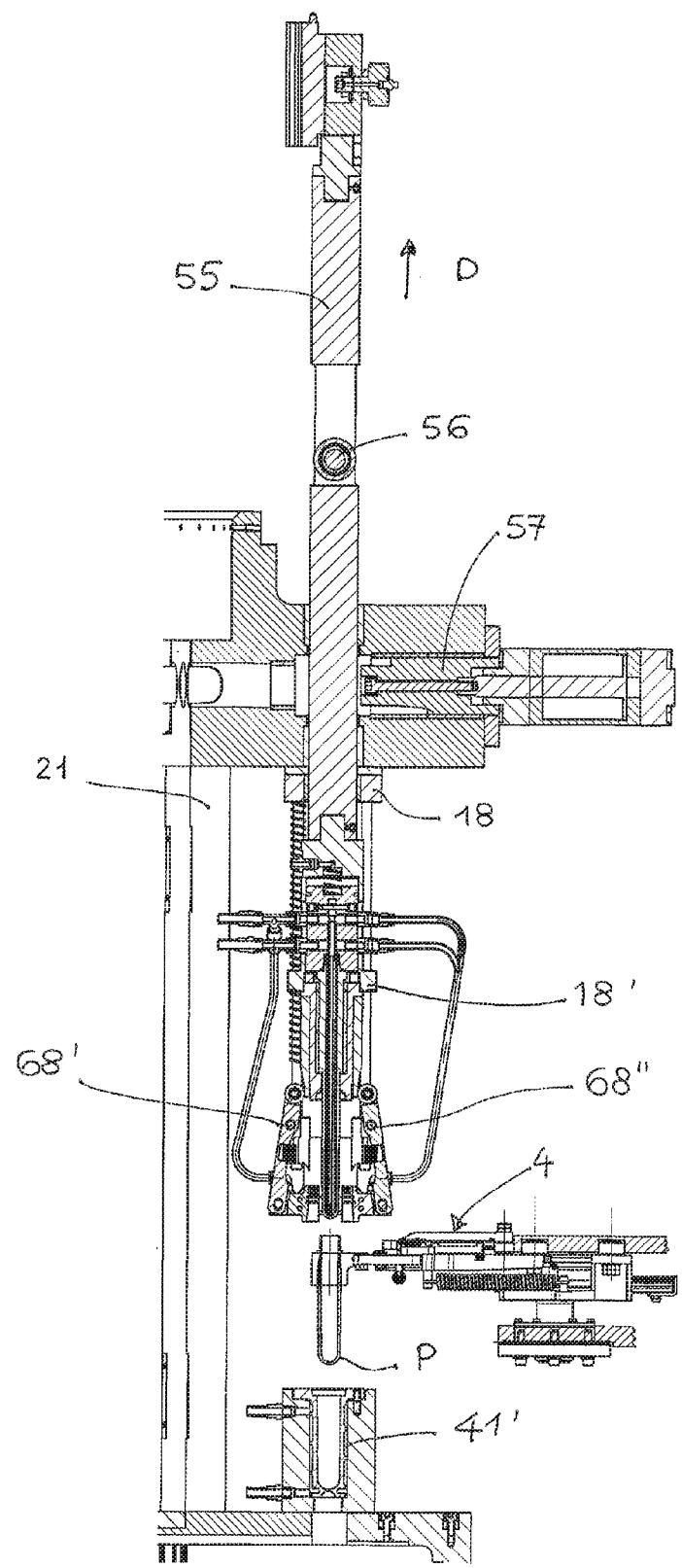

This fifth step corresponds to that shown in FIG. 14 but without the presence of melted resin in the mold.

Once the closing of mold 9' has been ensured, the shutter 32 of nozzle 31 is opened by means of the actuating device 37. Conduit 70 is closed by valve 36 at the same time as the shutter 32 is opened. The molding cavity 41' is thus filled by emptying tank 72. The melted resin enters into the cavity 41', pushed by the dual-acting piston 40, impresses an upwards thrust to the punch 59 which retracts because it is held in position in this instant by a loading spring 63 (FIG. 7*a*) of limited force of about 200 N. The preform molding cycle is completed and the first step described above begins with the introduction of high-pressure air into the compensation chamber 94.

The rotary motion of the various wheels of the plant is synchronized by means of electromechanical means, being a very high synchronization accuracy necessary for the grippers 4 to be in the correct picking position of the preforms P from the molds 9', 9", 9'''. The main embodiment includes the preforms P being extracted by the grippers 4 sequentially from each mold in sequence, while the injection of melted resin in the mold occurs in groups of three, the time offset between the opening of the first molding cavity of a module and the opening of the third molding cavity of the same module being very short and thus negligible for the purpose of greater or lesser permanence in the mold and of preform solidification.

In particular, at a circular sector of the rotary carousel 2, e.g. with an angle of about 60° in the middle, there are provided lifting and lowering means (not shown) of the rods 55 of the molds 9', 9", 9''', which enter into said circular sector during the rotation of the carousel 2 with respect to the axis Y. At the inlet of said circular sector, a rod 55 of the mold 9' is lifted by means of the wheel or tappet 230 (FIG. 4), which follows a cam surface of said lifting and lowering means of the rod along direction D. Such a cam surface is configured to control a vertical upward movement of the rod 55 at the inlet of said circular sector first and then a vertical downward movement of the rod 55 at the outlet of said circular sector. The second step of opening mold 9' (FIG. 15), the third step (FIG. 16) and the fourth step (FIG. 17) of extracting preform P from mold 9' are carried out during the passage of the mold 9' along the arc of circumference delimiting the aforesaid circular sector.

In the described embodiment, where the molding module 9 consists of three molds 9', 9", 9'", each molding cycle is applied to a module and three preforms are molded at the same time. When the molding module 9 passes in the aforesaid circular sector, three grippers 4 of the transfer star conveyor 50 (FIG. 1) enter in sequence into the opening space between the central part 13 and the lower part 14 of the corresponding three molds 9', 9", 9'" to grip the respective preforms P and transfer them subsequently to the cooling device 51.

All steps are controlled by appropriate cams (not all of which shown) designed to implement the required movements of all mold components.

The step of cooling preforms P by means of the cooling device 51 is provided at the end of the molding operations.

In a preferred, but not exclusive embodiment, the number of molding modules 9 is from 24 to 32, with a total number of molds 9', 9", 9'" between 72 and 96, three molds being provided for each module.

In FIG. 1 the extruder 1, the rotary carousel 2, the transfer star conveyor 50 and the cooling device 51 are arranged substantially in plan along a longitudinal axis. Alternatively, such components may be arranged so as to define in plan an L-shaped configuration or a Z-shaped configuration. In all cases, in order to replace the central part 13 of the molds, the arm 240 of a robot 250 may act on at least one of the two free sides of the four sides of the rotary carousel 2 to uncouple the bayonet couplings 15 from the respective rods 55 of the molds of a molding module 9.

In order to allow this uncoupling, a lifting system of the rods 55, e.g. of the pneumatic type, configured to lift the three rods 55 of the three molds provided in the single molding module 9 together, is advantageously provided on at least one of the two free sides of the rotary carousel 2. Once the rods 55 have been lifted, and thus once the molds have been opened by releasing the central part 13 from the lower part 14 containing the molding cavity, it is possible to replace the central part 13 with another having, for example, an extension 220 of different length.

The elements and features illustrated in the various preferred embodiments of the invention may be combined without departing from the scope of protection of the invention.

The invention claimed is:

1. An injection mold of a plastic preform comprising a first part and a second part, fixed to each other, and a third part,
    wherein the third part is provided with a molding cavity defining an axis Y' and is adapted to be integrally fixed to a first surface of a supporting element of the injection mold,
    wherein the second part is arranged between the third part and the first part and is adapted to slide along said axis Y' in order to close or open the molding cavity,
    wherein the first part comprises a longitudinal rod adapted to slide along said axis Y' through a second surface of the supporting element, opposite to and spaced apart from the first surface,
    wherein the second part is provided with
        a sliding guiding cage for guiding a sliding comprising a first plate, provided with a through hole through which the longitudinal rod can slide and configured for abutting on said second surface of the supporting element; a base structure; parallel guiding rods fixed at a first end thereof to said first plate and fixed at a second end thereof to said base structure,
        an assembly capable of sliding inside said sliding guiding cage, fixed at a first end thereof to said longitudinal rod, and comprising at a second end thereof a punch capable of sliding inside the base structure and defining a first complementary component of the molding cavity delimiting an inner shape of the plastic preform,
    wherein the base structure is provided with two half-collars and is configured so as to define, together with the punch, a cam system for opening or closing the two half-collars which define, when they are closed, a second complementary component of the molding cavity defining an outer shape of a neck zone of the plastic preform,
    wherein the third part is adapted to be integrally fixed to said first surface by means of first quick-coupling means,
    wherein the assembly is fixed at said first end thereof to the longitudinal rod by means of a second quick-coupling means,
    and wherein there is provided at least one extension which can be either added or removed for a change of format for preforms to be molded having different length or format,
    said at least one extension being provided between the second quick-coupling means and the assembly and/or being provided on the longitudinal rod.

2. The injection mold according to claim 1, wherein said cam system comprises at least one cam, fixed outside the punch, and two rocker arms pivoted on respective pins of the base structure and on which respective tappets which follow the at least one cam are fixed.

3. The injection mold according to claim 2, wherein return springs are provided for keeping a contact of the tappets of the rocker arms on the at least one cam.

4. The injection mold according to claim 1, wherein the assembly comprises a cylinder which is provided with a chamber, in which there is accommodated a piston to which the punch is integrally fixed, and is fixed at a first end thereof to said second quick-coupling means, and is provided at a second end thereof with a flat part, sliding along the parallel guiding rods parallel to the first plate.

5. The injection mold according to claim 4, wherein return springs are provided, fixed at a first end thereof to the first plate and fixed at a second end thereof to the flat part of the cylinder.

6. The injection mold according to claim 4, wherein a spring is provided inside the cylinder for generating a thrust on the punch when filling the molding cavity with melted plastic.

7. The injection mold according to claim 1, wherein said second quick-coupling means are a bayonet coupling.

8. The injection mold according to claim 7, wherein the bayonet coupling comprises a sleeve arranged about a clutch base with a constraint which allows an angular rotation thereof about the axis Y', but is integral in a direction parallel to the axis Y' with the clutch base.

9. The injection mold according to claim 8, wherein the sleeve is provided with teeth directed towards an interior of a cavity thereof and shaped to be inserted into corresponding longitudinal grooves of the longitudinal rod and for sliding into an annular groove of said longitudinal rod with a relative rotation of about 60° between the longitudinal rod and the sleeve.

10. The injection mold according to claim 1, wherein the third part is provided with a clutch, arranged at a base of the molding cavity, which can cooperate with the first quick-coupling means provided on said first surface of the supporting element.

11. The injection mold according to claim 1, wherein the longitudinal rod is provided with a tappet element adapted to follow a cam surface adapted to controls a movement along the axis Y' of the first part and of the second part of the mold during a molding operation.

12. The injection mold according to claim 1, wherein a wedge is provided for blocking or unblocking the longitudinal rod, said wedge being controlled by a pneumatic unblocking actuator and adapted to be inserted into or removed from a seat provided on said longitudinal rod.

13. An injection-compression apparatus for manufacturing plastic preforms, having a vertical rotation axis Y, comprising a fixed supporting base, a rotating carousel, adapted to rotate about the vertical rotation axis Y with respect to the fixed supporting base, a plurality of molds arranged along a periphery of the rotating carousel, said plurality of molds being gathered together into molding modules of at least two molds each, wherein each mold is an injection mold according to claim 1.

14. A method of assembling an injection mold according to claim 1, comprising the following steps:

a) integrally fixing the first part with the second part of the injection mold by hooking the longitudinal rod to the assembly, sliding within the sliding guiding cage, by means of the second quick-coupling means, b) integrally fixing the third part of the injection mold to said first surface of a supporting element by hooking a clutch, arranged at a base of the molding cavity, to said first surface by means of the first quick-coupling means.

* * * * *